(12) United States Patent
Kachi et al.

(10) Patent No.: US 6,233,497 B1
(45) Date of Patent: May 15, 2001

(54) CONTACT DETECTING METHOD AND AN APPARATUS FOR THE SAME

(75) Inventors: Mitsuyasu Kachi; Toshiki Tanaka, both of Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/153,889

(22) Filed: Sep. 16, 1998

(30) Foreign Application Priority Data

Sep. 18, 1997 (JP) .......................................... 2-53990

(51) Int. Cl.$^7$ ............................. G06F 19/00; B24B 49/16
(52) U.S. Cl. ............................. 700/173; 700/61; 700/63; 700/150; 700/164; 700/188; 451/9
(58) Field of Search .................................. 700/63, 61, 64, 700/150, 160, 164, 170, 188, 190, 173; 451/9

(56) References Cited

U.S. PATENT DOCUMENTS

| | | | |
|---|---|---|---|
| 4,662,122 | * 5/1987 | Ohmura et al. ........................... | 451/5 |
| 4,704,689 | * 11/1987 | Asakura ................................. | 700/191 |
| 5,133,158 | * 7/1992 | Kihara et al. ........................... | 451/11 |
| 5,224,032 | * 6/1993 | Worn et al. ............................. | 700/61 |
| 5,315,789 | * 5/1994 | Takashi .................................. | 451/5 |
| 6,008,612 | * 12/1999 | Tanaka et al. ......................... | 318/652 |

FOREIGN PATENT DOCUMENTS 58-124907 7/1983 (JP) .
60-22113 2/1985 (JP) .

* cited by examiner

Primary Examiner—William Grant
Assistant Examiner—Paul Rodriguez
(74) Attorney, Agent, or Firm—Sughrue, Mion, Zinn, Macpeak & Seas, PLLC

(57) ABSTRACT

Under the conditions that the tool is movable in an X-axial direction for approaching a work W and in a Y-axial direction perpendicular to the X-axial direction, the tool is moved at a specified speed in the X-axial direction to make the tool approach a work W and at the same time the tool is reciprocally moved at a specified frequency and a specified amplitude to detect a load fluctuation component for the tool in the X-axial direction during movement of the tool, and contact between the tool and the work W is detected according to this load fluctuation component.

30 Claims, 16 Drawing Sheets

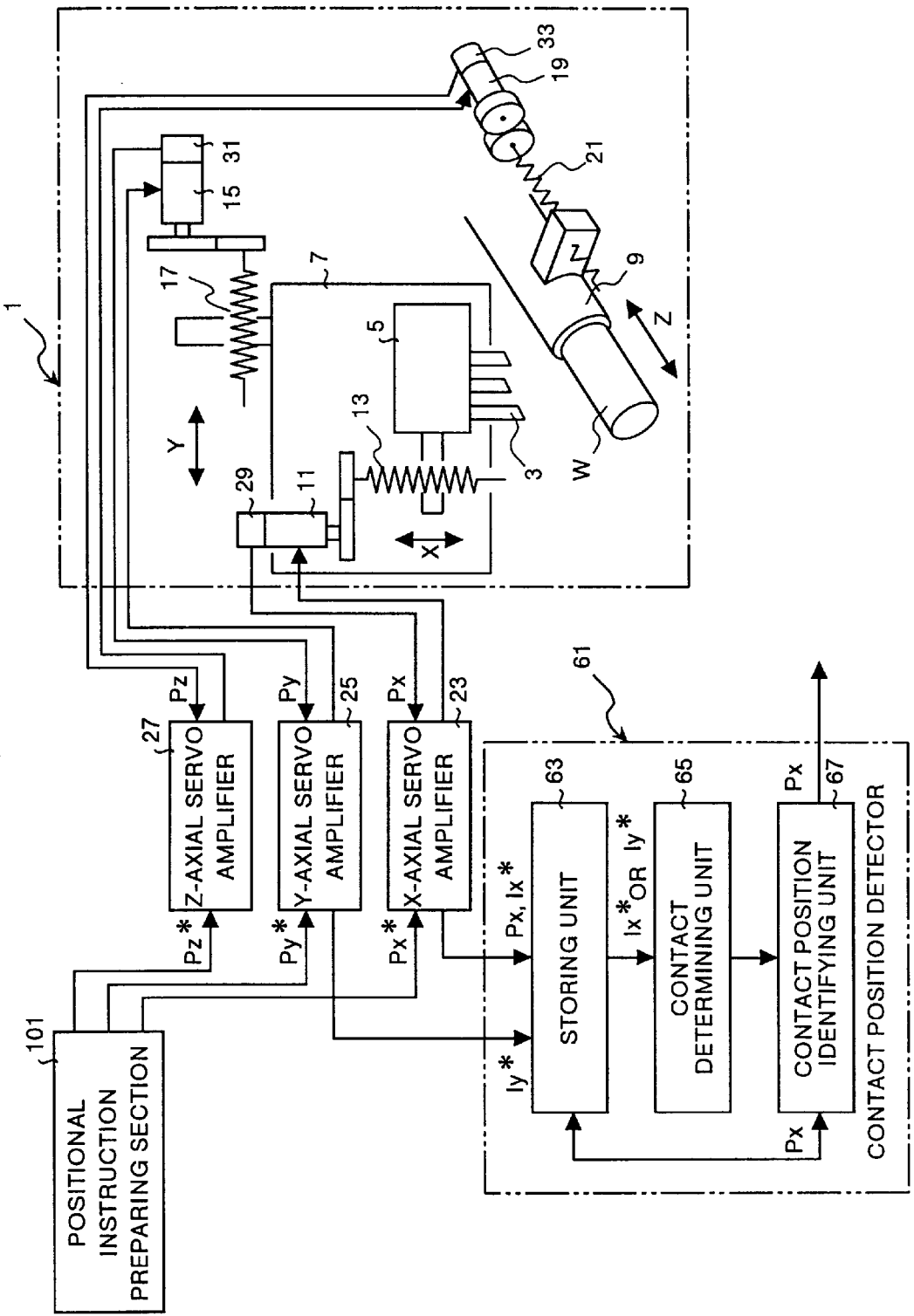

DETERMINATION ON CONTACT

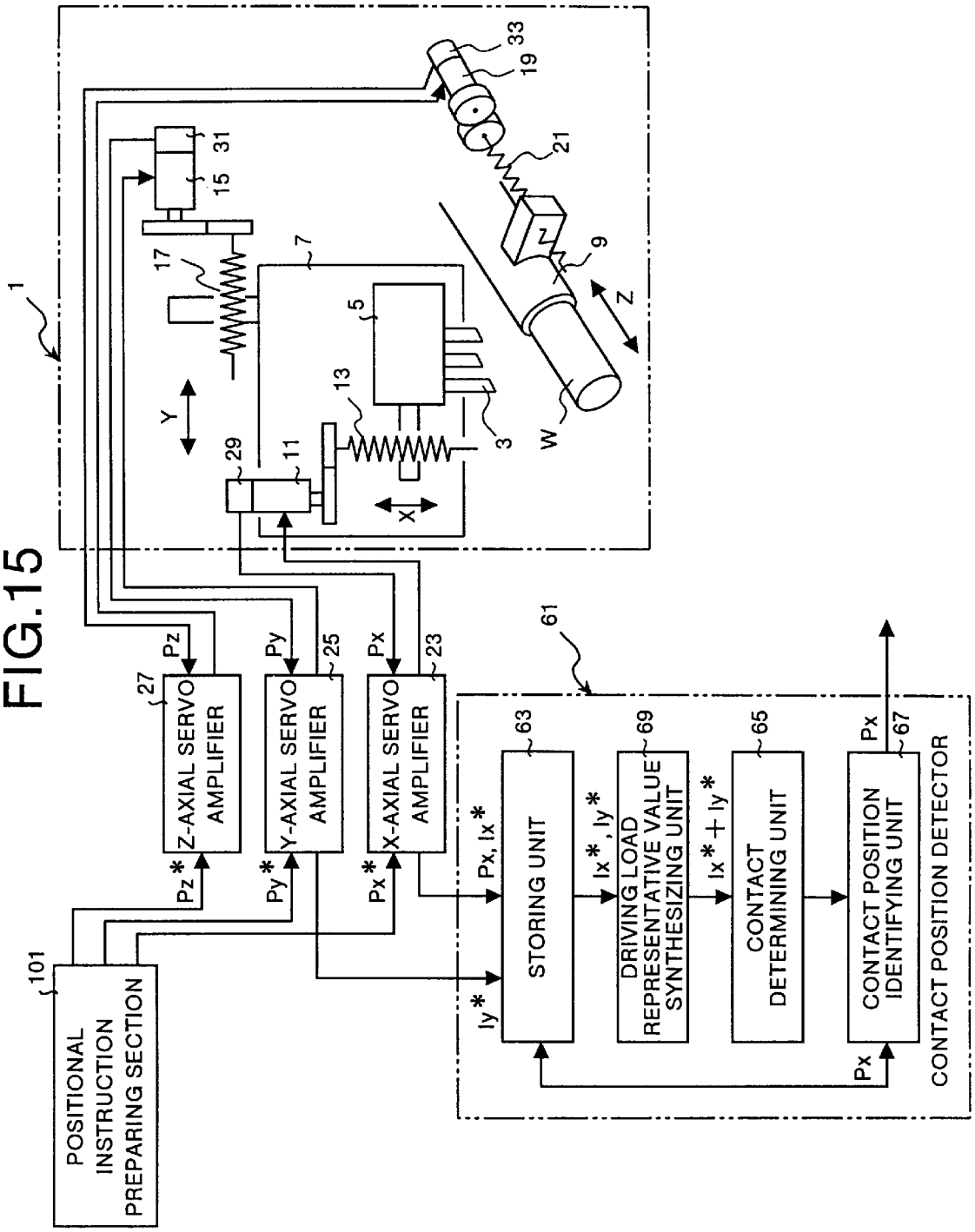

CONTACT DETECTING METHOD AND AN APPARATUS FOR THE SAME

FIELD OF THE INVENTION

The present invention relates to a contact detecting method and an apparatus for the same, and more specifically to a contact detecting method and an apparatus for the same to detect a position that a movable body such as a machining tool or an effector has contacted an object for contact such as a work or a reference position setting member for automatic tool set or positional controls in machining tool, industrial machine, or robots.

BACKGROUND OF THE INVENTION

As contact detecting apparatuses based on the conventional technology, there have been the ones which detect a contact between a machining tool and a work according to a voltage change in a servo motor for driving a main axis as disclosed in Japanese Patent Laid-Open Publication No. SHO 60-22113, or the ones which determine that a slide table has contacts a stopper located at a fixed position or a stroke restricting section (reference position setting member) by checking that a current flowing in a motor for driving the slide table has becomes an excessive current as disclosed in Japanese Patent Laid-open Publication No. SHO 58-124907.

In the conventional type of contact detecting apparatuses, to improve reliability of contact detection, it is necessary to continue driving a movable body such as a tool or a slide table even after the movable body actually contacts an object for contact such as a work or a reference position setting member for a certain period of time in the same direction for the purpose to obtain a relatively large and clear load fluctuation component, which may result in damages of the movable body and object for contact.

Especially, when the movable body is a sharp tool such as a bite, as a biting area on a work is small, load fluctuation is fine, and sometimes an accurate contact position can not be detected. To make the load fluctuation component larger, it is required to make the biting rate large or to increase the thrust-in speed, and as a result a large biting damages are generated in the work and also damages such as chipping are given to a tool such as a bite.

SUMMARY OF THE INVENTION

It is an object of the present invention to obtain a contact detecting method capable of contact detection with high precision and high reliability and a contact detecting apparatus applicable for execution of the method.

With the contact detecting method according to the present invention, a movable body is moved in the first direction (for instance, in the X-axial direction) at a specified speed to make the movable body approach the object for contact and at the same time is reciprocally moved in the second direction (for instance, in the Y-axial direction) to detect fluctuation of load to this movable body in the first direction and contact between the movable body and the object for contact is detected according to the load fluctuation.

With the contact detecting method according to the present invention, in a state where movement of the movable body in the second direction is stopped and at the same time the movable body is moved in the first direction (for instance, in the X-axial direction) at a specified speed to make the movable body approach the object for contact, fluctuation of load to this movable body in the second direction (for instance, in the Y-axial direction) is detected and contact between the movable body and the object for contact is detected according to the load fluctuation.

In the contact detecting method according to the present invention, in the state where movement of the movable body in the second direction is stopped and at the same time the movable body is moved in the first direction at a specified speed to make the movable body approach the object for contact by superimposing reciprocal movement to movement of the movable body, fluctuation of load to this movable body in the second direction is detected, and a contact between the movable body and the object for contact is detected according to this load fluctuation.

In the contact detecting method according to the present invention, in a state where the movable body is moved in the first direction (for instance, in the X-axial direction) and in the second direction (for instance, in the Y-axial direction) at a specified speed respectively to make the movable body approach the object for contact, fluctuation of load to the movable body in the first direction or in the second direction is detected, and contact between the movable body and the object for contact is detected according to the load fluctuation.

In the contact detecting method according to the invention, in a state where the movable body is moved at a specified speed in the first direction as well as in the second direction to make the movable body approach the object for contact by superimposing reciprocal movement in the first direction or in the second direction to movement of the movable body, fluctuation of load to the movable body in the first direction or in the second direction is detected, and contact between the movable body and the object for contact is detected according to the load fluctuation.

In the contact detecting method according to the invention, in a state where the movable body is moved at a specified speed in the first direction and in the second direction respectively to make the movable body approach the object for contact by superimposing reciprocal movement in the first and second directions to movement of the movable body, fluctuation of load to the movable body in the first direction or in the second direction is detected, and contact between the movable body and the object for contact is detected according to the load fluctuation.

In the contact detecting method according to the invention, in a state where the movable body is moved at a specified speed in the first direction for approaching the object for contact (for instance, in the X-axial direction) to make the movable body approach the object for contact and at the same time the object for contact is moved in the second direction slanting at a certain angle against the first direction (for instance, in the Y-axial direction), fluctuation of load to the object for contact in the second direction is detected, and contact between the movable body and the object for contact is detected according to this load fluctuation.

In the contact detecting method according to the invention, in a state where the movable body is moved at a specified speed in the first direction to make the movable body approach the object for contact by superimposing reciprocal movement in the first direction to movement of the movable body and also the object for contact is moved in the third direction, fluctuation of load to the object for contact in the first direction is detected, and contact between this load fluctuation and the object for contact is detected according to this load fluctuation.

In the contact detecting method according to the invention, in a state where the movable body is moved in the first direction at a specified speed to make the movable body approach the object for contact and is also reciprocally moved in the second direction (for instance, in the Y-axial direction) to make the movable body approach the object for contact and at the same time the object for contact is moved in the third direction slanting at a certain angle against the first direction, fluctuation of load to the object for contact in the third direction is detected, and contact between the movable body and the object for contact is detected according to this load fluctuation.

In the contact detecting method according to the invention, in a state where the movable body is moved at a specified speed in the first direction for approaching the object for contact to make the movable body approach the object for contact and also the object for contact is moved in the second direction with reciprocal movement in the second direction superimposed to the movement of the object for contact, fluctuation of load to the object for contact in the second direction is detected, and contact between the movable body and the object for contact is detected according to this load fluctuation.

In the contact detecting method according to the present invention, contact between the movable body and the object for contact is detected according to a combination of load fluctuations in the first direction and in the second direction, a combination of those in the first direction and in the third direction, a combination of those in the second direction and in the third direction, or a combination of those in the first direction, second direction, and third direction.

In the contact detecting method according to the present invention, a representative value for driving load such as an instruction value for speed integration, an instruction value for current, or a current feedback value and positional data of the movable body in the first direction are stored in time series during a specified period of time, determination that contact between the movable body and the object for contact has occurred is made when a change rate of the representative value for driving load exceeds a specified value during the specified period of time, a point of time when the representative value for driving load starts changing is detected from this point of time when it is determined that the contact between the movable body and the object for contact has occurred, and a position indicated by positional data of the movable body in the first direction at this point of time when the change is started is regarded as a contact position.

In the contact detecting method according to the present invention, a representative value for driving load such as an instruction value for speed integration, an instruction value for a current, or a current feedback value and positional data for the movable body in the first direction are stored in time series for a specified period of time, determination that contact between the movable body and the object for contact has occurred if a frequency component of reciprocal movement appears in the representative value for driving load in the specified period of time, a point of time when the representative value for driving load starts changing is detected from this point of time when it is determined that the contact between the movable body and the object for contact has occurred, and a position indicated by positional data for the movable body in the first direction at this point of time when the change is regarded as a contact position.

In the contact determining method according to the present invention, a zone in which it is expected for load fluctuation in the first direction to cyclically increase in response to a frequency of reciprocal movement in the second direction is specified according to reciprocal movement in the first direction or in the second direction, and determination as to a contact between the movable body and the object for contact is made by checking whether a change rate of load fluctuation in this zone has exceeded a specified value or not.

In the contact detecting method according to the invention, a representative value for driving load in a non-contact state is previously measured together with positional data for the movable body and stored as a reference change rate, an instruction value for speed integration, an instruction value for a current, or a current feedback value in PI controls for the servo unit for driving in a direction as an object for detection of load fluctuation is detected as a representative value for driving load, a position of the movable body in the first direction at a point of time when a difference between this representative value for driving load and the reference change rate or a change rate in the difference has exceeded a specified value, a point of time when the representative value starts changing is detected from this point of time when it is determined that the contact between the movable body and the object for contact has occurred, and a position indicated by positional data for the movable body in the first direction at the point of time when the representative value starts changing is regarded as a contact position.

In the contact detecting method according to the present invention, a frequency and an amplitude of reciprocal movement is changeably set according to materials of the movable body and the object for contact.

In the contact detecting apparatus according to the present invention, in a state where the movable body is moved by the control unit at a specified speed in the first direction (for instance, in the X-axial direction) to make the movable body approach the object for contact and is also moved reciprocally in the second direction (for instance, in the Y-axial direction), fluctuation of load to this movable body in the first direction is detected, and contact between the movable body and the object for contact is determined by the contact determining unit according to this load fluctuation.

In the contact detecting apparatus according to the invention, in a state where movement of the movable body in the second direction is stopped by the control unit and the movable body is moved at a specified speed in the first direction (for instance, in the X-axial direction) to make the movable body approach the object for contact, fluctuation of load to this movable body in the second direction (for instance, in the Y-axial direction) is detected, and contact between the movable body and the object for contact is determined by the contact determining unit according to this load fluctuation.

In the contact detecting apparatus according to the invention, in a state where movement of the movable body in the second direction is stopped by the control unit and the movable body is moved by the control unit at a specified speed in the first direction to make the movable body approach the object for contact by superimposing reciprocal movement in the first direction to the movement of the movable body, fluctuation of load to this movable body in the second direction is detected, and contact between the movable body and the object for contact is determined by the contact determining unit according to this load fluctuation.

In the present invention, in a state where the movable body is moved by the control unit at a specified speed in the first direction (for instance, in the X-axial direction) and in the second direction (for instance, Y-axial direction) respectively to make the movable body approach the object for contact, fluctuation of load to this movable body in the first direction or in the second direction is detected, and contact between the movable body and the object for contact is determined by the contact determining unit according to this load fluctuation.

In the contact detecting apparatus according to the invention, in a state where the movable body is moved by the control unit at a specified speed in the first direction and in the second direction respectively to make the movable body approach the object for contact with reciprocal movement in the first direction or in the second direction superimposed to movement of the movable body, fluctuation of load to the movable body in the first direction or in the second direction is detected, and contact between the movable body and the object for contact is determined by the contact determining unit according to this load fluctuation.

In the contact detecting apparatus according to the invention, the movable body is moved by the control unit at a specified speed in the first direction and in the second direction respectively to make the movable body approach the object for contact with reciprocal movement in the first direction and in the second direction superimposed to the movement of the movable body, fluctuation of load to this movable body in the first direction or in the second direction is detected, and contact between the movable body and the object for contact is determined by the contact determining unit.

In the contact detecting apparatus according to the present invention, in a state where the movable body is moved by the control unit at a specified speed in the first direction for approaching the object for contact (for instance, in the X-axial direction) to make the movable body approach the object for contact and at the same time the object for contact is moved in the third direction (for instance, in the Z-axial direction) slanting at a certain angle against the first direction, fluctuation of load to the object for contact in the third direction is detected, and contact between the movable body and the object for contact is determined by the contact determining unit according to this load fluctuation.

In the contact detecting apparatus according to the present invention, in a state where the movable body is moved by the control unit at a specified speed in the first direction for approaching the object for contact to make the movable body approach the object for contact with reciprocal movement in the first direction superimposed to the movement of the movable body and also the object for contact is moved in the third direction slanting at a certain angle against the first direction, fluctuation of load to the object for contact in the third direction is detected, and contact between the movable body and the object for contact is determined by the contact determining unit.

In the contact detecting apparatus according to the present invention, in a state where the movable body is moved by the control unit at a specified speed in the first direction to make the movable body approach the object for contact reciprocally moving the movable body in the second direction (for instance, in the Y-axial direction) and also the object for contact is moved in the third direction slanting at a certain angle against the first direction, fluctuation of load to the object for contact in the third direction is detected, and contact between the movable body and the object for contact is determined by the contact determining unit according to this load fluctuation.

In the contact detecting apparatus according to the invention, in a state where the movable body is moved by the control unit at a specified speed in the first direction for approaching the object for contact to make the movable body approach the object for contact and also the object for contact is moved in the third direction with reciprocal movement in the third direction superimposed to the movement, fluctuation of load to the object for contact in the third direction is detected, and contact between the movable body and the object for contact is determined by the contact determining unit according to this load fluctuation.

In the contact detecting apparatus according to the invention, the contact determining unit determines contact between the movable contact and the object for contact according to a combination of load fluctuations in the first direction and the second direction, a combination of those in the first direction and the third direction, a combination of those in the second direction and the third direction, or a combination of those in the first direction, second direction, and third direction.

In the contact detecting apparatus according to the present invention, the storing unit stores therein a representative value for driving load such as an instruction value for speed integration, an instruction value for current, or a current feedback value and positional data of the movable body in the first direction in time series for a specified period of time, and the contact determining unit determines, when a change rate of the representative value for driving load exceeds a specified rate during the specified period of time, that contact between the movable body and the object for contact has occurred, and the contact position identifying unit detects a point of time when the representative value for driving load starts changing from this point of time when it is determined that contact between the movable body and the object for contact has occurred and regards as a contact position a position indicated by positional data for the movable body in the first direction at this point of time when the change is started.

In the contact detecting apparatus according to the invention, the storing unit stores therein a representative value for driving load such as an instruction value for speed integration, an instruction value for a current, or a current feedback value and positional data for the movable body in the first direction in time series for a specified period of time, the contact determining unit determines, when a frequency component of reciprocal movement appears in the representative value for the specified period of time, that contact between the movable body and the object for contact has contacted, and the contact position identifying unit detects a point of time when the representative value for driving load starts changing from this point of time when it is determined that contact between the movable body and the object for contact has occurred and regards as a contact position a position indicated by position data for the movable body in the first direction at this point of time when the change is started.

In the contact detecting apparatus according to the invention, a zone in which it is expected for the load fluctuation in the first direction to cyclically increase in response to a frequency of the reciprocal movement due to the reciprocal movement in the first direction or in the second direction is specified by the contact determined unit, and contact between the movable body and the object for contact is determined by checking whether a change rate of load has exceeded in a specified rate in this zone or not.

In the contact detecting apparatus according to the present invention, the storing unit previously stores a representative value for driving load in a non-contact state together with positional data for the movable body as a reference change rate, wherein said contact determining unit determines as a contact-determined position a position of the movable body in the first direction at a point of time when a difference between the representative value for driving load and the reference change rate stored in the storing unit or a change rate in the difference has exceeded a specified value, and the contact position identifying unit detects a point of time when the representative value for driving load starts changing from the point of time when it is determined that contact has occurred and regarding as a contact position a position indicated by positional data of the movable body in the first direction at this point of time when the representative value for driving load starts changing.

In the contact detecting apparatus according to the invention, the control unit changeably sets a frequency and an amplitude of reciprocal movement in each direction according to materials of the movable body or the object for contact.

Other objects and features of this invention will become understood from the following description with reference to the accompanying drawings.

BRIEF DESCRIPTION OF THE DRAWING

FIG. 9 is an explanatory view showing configuration in Embodiment 3 of the contact detecting apparatus according to the present invention;

FIG. 15 is an explanatory view showing configuration in Embodiment 5 of the contact detecting apparatus according to the present invention.

DESCRIPTION OF THE PREFERRED EMBODIMENT

Figure 1:
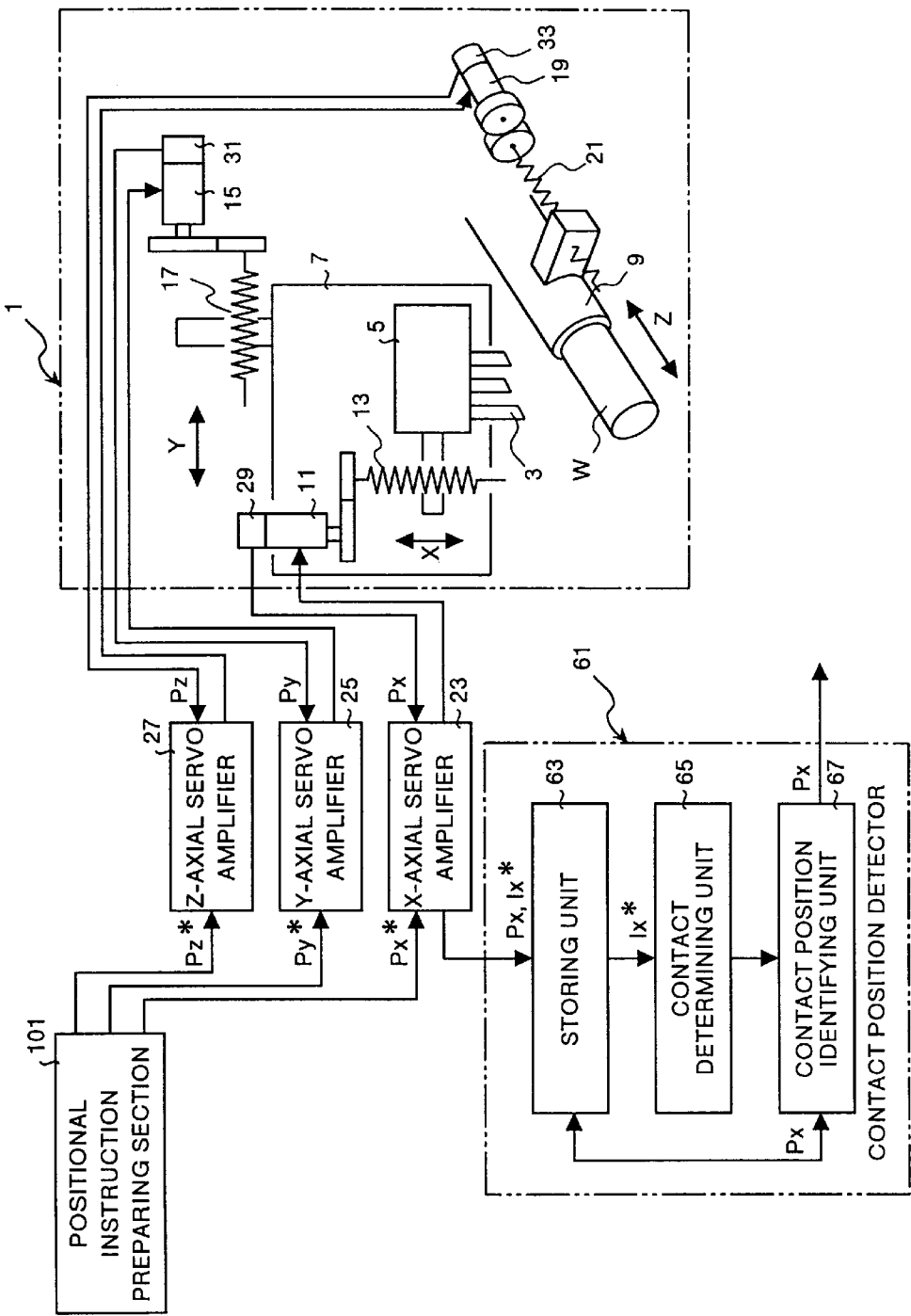
FIG. 1 is an explanatory view showing configuration in Embodiment 1 of the contact detecting apparatus according to the preset invention.

Next description is made for embodiments of the contact detecting method and the contact detecting apparatus according to the present invention with reference to the attached drawings. It should be noted that, in the following description of the embodiments, each axial direction in a three-dimensional orthogonal coordinate system is defined as follows:

First axial direction: X-axial direction for approaching a work W as an object for contact Second axial direction: Y-axial direction perpendicular to the X-axial direction as the first axial direction Third axial direction: Z-axial direction perpendicular to the X-axial direction as the first axial direction FIG. 1 to FIGS. 3A to 3C show Embodiment 1 of the contact detecting apparatus according to the present invention. In FIG. 1, the reference numeral 1 indicates a machine tool. The machine tool 1 comprises a an X-axial tool base 5 for holding a tool 3 as a movable body and capable of reciprocally moving in the X-axial direction, a Y-axial tool base 7 for reciprocally moving the X-axial tool base 5 in the Y-axial direction, and a Z-axial work head 9 for holding a rod-shaped work W and capable of reciprocally moving in the Z-axial direction.

The X-axial tool base 5 is moved in the X-axial direction by an X-axial feed screw 13 driven by an X-axial servo motor 11, the Y-axial tool base 7 is moved in the Y-axial direction by a Y-axial feed screw 17 driven by a Y-axial servo motor 15, and the Z-axial work head 9 is moved in the Z-axial direction by the Z-axial feed screw 21 driven by the Z-axial servo motor 19. The X-axial, Y-axial, and Z-axial servo motors 11, 15, 19 are separately controlled by an X-axial servo amplifier (Servo controller) 23, a Y-axial servo amplifier 25, and a Z-axial servo amplifier 27 respectively.

The X-axial servo amplifier 23 receives an X-axial positional instruction value (positional instruction signal) Px* from a positional instruction preparing section 101 in a numerical controller, also receives a positional feedback value (positional feedback signal) Px from an X-axial rotary encoder (position detector) 29 provided as a slave device for the X-axial servo motor 11, and provides X-axial positional controls in the feedback compensation system controlling a power supply rate to the X-axial servo motor 11.

The Y-axial servo amplifier 25 receives a Y-axial positional instruction value Py* from the positional instruction section 101 in a numerical controller, also receives a positional feedback value Py from a Y-axial rotary encoder 31 provided as a slave device for the Y-axial servo motor 15, and provides Y-axial positional controls in the feedback compensation system controlling a power supply rate to the Y-axial servo motor 15.

The Z-axial servo amplifier 27 receives a Z-axial positional instruction value Pz* from the positional instruction preparing section 101 in a numerical controller, also receives a positional feedback value Pz from a Z-axial rotary encoder 33 provided as a slave device for the Z-axial servo motor 19, and provides Z-axial positional controls in the feedback compensation system controlling a power supply rate to the Z-axial servo motor 19.

Figure 2:
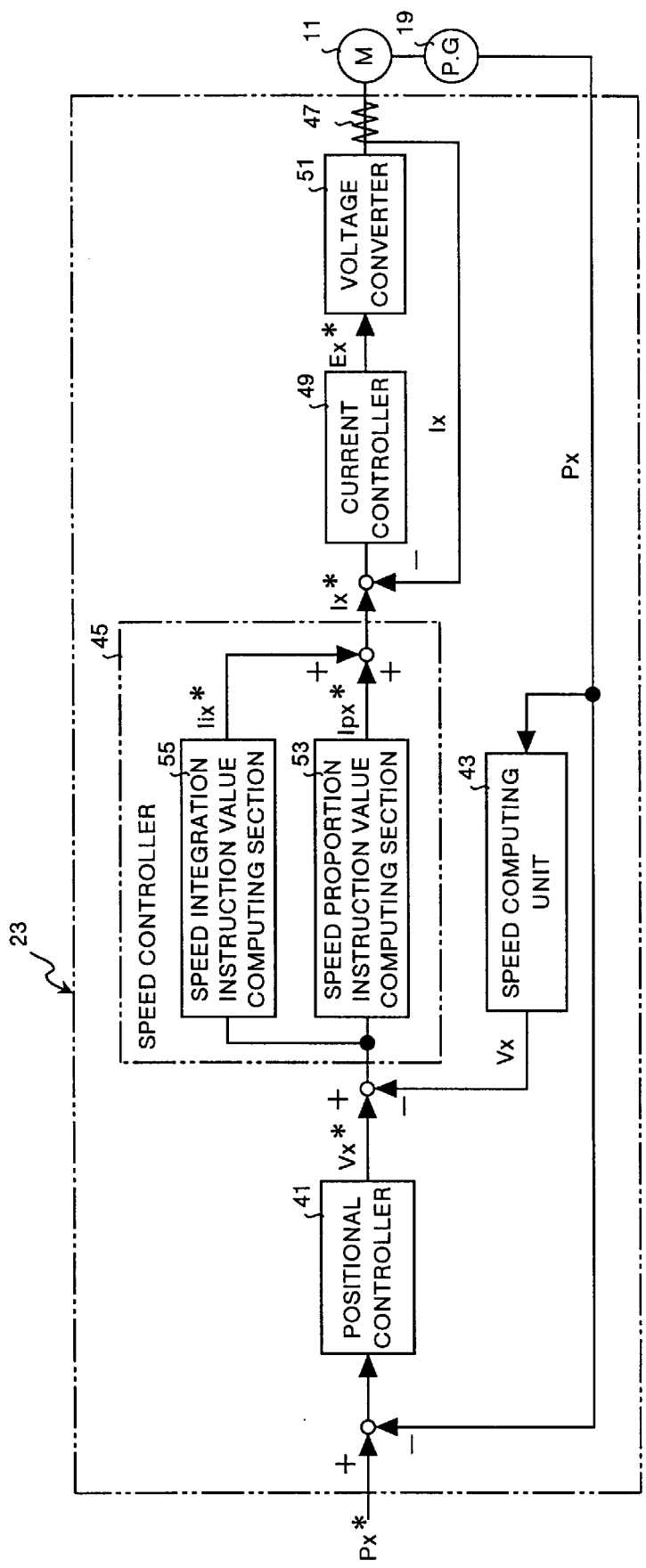
FIG. 2 is a block diagram showing an example of an X-axial servo amplifier using in Embodiment 1 of the contact detecting apparatus according to the present invention.

FIG. 2 shows a specific example of the X-axial servo amplifier 23. The X-axial servo amplifier 23 is based on a general control system in which a positional control loop is a main loop, and a speed control loop and a current control loop are miner loops, and comprises a positional controller 41 for generating an X-axial speed instruction value (positional instruction signal*) Vx* corresponding to a deviation between the X-axial positional instruction value Px* and the positional feedback value Px, a speed controller 45 for generating a current instruction value (current instruction signal) Ix* corresponding to a deviation between the speed instruction value Vx* and the speed feedback value Vx from a speed computing unit 43, a current controller 49 for a voltage instruction value (voltage instruction signal) Ex* corresponding to a deviation between the current instruction value Ix* and a current feedback value Ix from a current detector 47, and a voltage converter 51 comprising an inverter or the like for controlling a voltage given to the X-axial servo motor 11 according to the voltage instruction value (voltage instruction signal) Ex* from the current controller 49.

The speed controller 45 provides PI controls, and comprises a speed proportion instruction value computing section 53 for computing a speed proportion instruction value (P component) Ipx*, and a speed integration instruction value computing section 55 for computing a speed integration instruction value (I component) Iix*, and outputs a current instruction value Ix* for the X axis by adding the speed proportion instruction value Ipx* to the speed integration instruction value Iix*.

It should be noted that also the Y-axial servo amplifier 25 and Z-axial servo amplifier 27 has the same configuration as that of the X-axial servo amplifier 23 as described above although each of the amplifiers 25, 27 has a different axis as an object for control, description thereof is omitted herein.

An axial control unit for each axis is formed with the positional instruction preparing section 101 in a numerical controller and each of the servo amplifiers 23, 25, 27 for each axis as described above.

The axis control unit comprising the positional instruction preparing section 101, X-axial servo amplifier 23, Y-axial servo amplifier 25 moves the tool 3 together with the X-axial tool base 5 at a specified speed in the X-axial direction for approaching an outer peripheral surface of the work W as an object for contact, and reciprocally moves the Y-axial tool base 7 at a specified frequency and a specified amplitude while making the tool 3 approach the outer peripheral surface of the work W.

An appropriate value for a frequency of this reciprocal movement varies according such factors as a type of the tool 3, materials and size of the work W, but generally the value is in a range from 5 to 40 Hz, and the amplitude should preferably be in a range from 10 to 60 µm. For instance, if the tool 3 is a grooving tool, the grooving tool is duller than a parting tool, and has a larger contact area with the work W, so that the amplitude may be smaller than that in a case of a parting tool, and in a case where the work W is a stainless steel rod with a diameter of 20 mm, if the frequency is around 15 Hz, the optimal amplitude is around 20 µm in a case of grooving tool and around 30 µm in a case of a parting tool.

The lower rigidity of the work is in a case, for instance, where the work W is made from aluminum, the smaller inclination of load fluctuation in contact is, so that the optimal amplitude is larger, and when the work W is an aluminum one with a diameter of 20 mm and a frequency is around 15 Hz, the optimal amplitude is around 40 µm in a case of a parting tool. Further, the smaller a diameter of the work W is, the more easily the work W vibrates, so that both the optimal amplitude and optimal frequency are smaller. For instance, when the work W is an aluminum one with a diameter of 4 mm and a parting tool is used, the optimal frequency is in a range from around 5 to around 10 Hz, and the optimal amplitude is around 20 µm. It should be noted that the frequency and amplitude can changeably be set according to a type of the tool 3 and materials or size of the work W by setting appropriate parameters.

The contact position detector 61 comprises a storing unit 63, a contact determining unit 65, and a contact position identifying unit 67 (Refer to FIG. 1).

A target axis for detection of load fluctuation in this embodiment is an X axis (a constant feed axis), and the storing unit 63 stores therein, when detecting contact, the speed integration instruction value Iix*, current instruction value Ix*, or current feedback value Ix in PI controls for a servo device to be driven in the X-axial directions as an object for detection of load fluctuation as a representative value for driving load, and at the same time stores a positional feedback value (positional data) Px in the X-axial direction in time series. In other words, the storing unit 63 stores a representative value for driving load in the X-axial direction (for instance, a current instruction value Ix*) and X-axial positional data Px as a pair adding a time tag thereto.

The contact determining unit 65 fetches, while the above-described tool as an object for detection of contact is moving, a representative value for driving load in the X-axial direction (speed integration instruction value Iix*, a current instruction value Ix*, or a current feedback value Ix) from the storing unit 63, detects a load fluctuation component in the X-axial direction from the representative value for driving load, and determines according to the load fluctuation component that the tool 3 has contacted the work W. The contact position identifying unit 67 fetches positional data Px in the X-axial direction from the storing unit 63 according to a result of determination by the contact determining unit 65, and identifies a position indicated by the X-axial positional data as a contact position.

As described above, by reciprocally moving the tool 3 at a specified frequency in the Y-axial direction (lateral direction) while moving the tools at a contact speed in the X-axial direction to make the tool 3 contact the work W, the tool 3 repeatedly contacts and separates from the work W after start of contact.

Figure 3A:
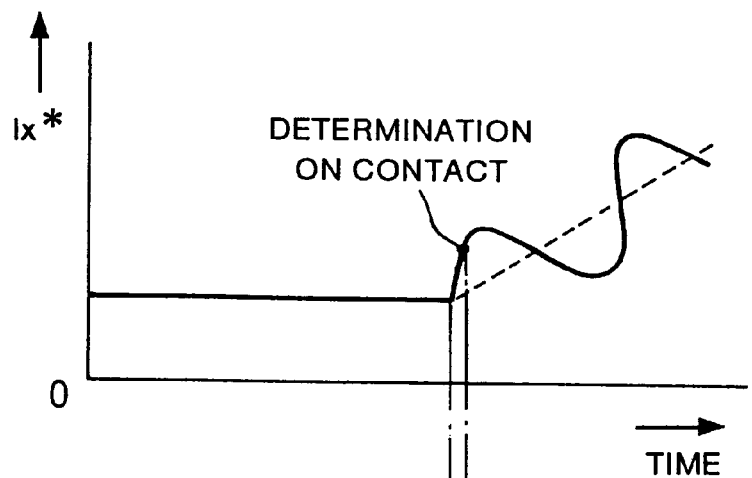
FIG. 3A is a view showing graphs for characteristics of a representative value for driving load in the X-axial direction in Embodiment 1.
Figure 3B:
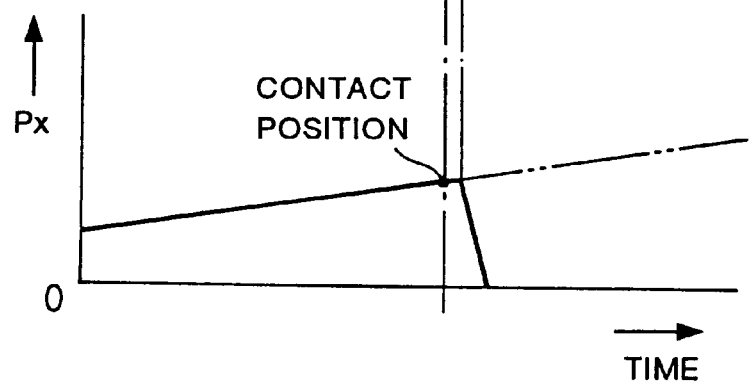
FIG. 3B shows a positional characteristics in the X-axial direction.
Figure 3C:
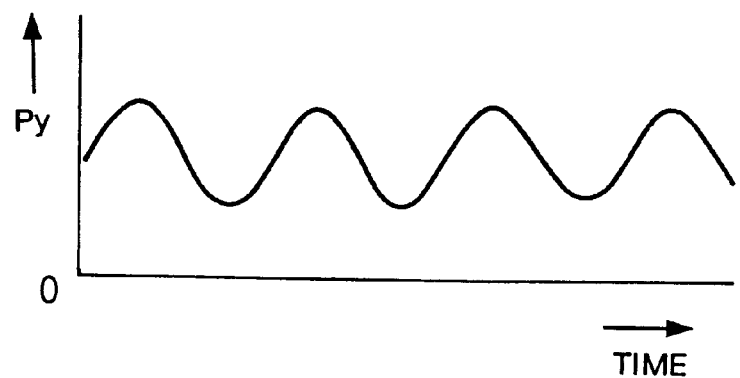
FIG. 3C shows positional characteristics in the Y-axial direction.

With this configuration, as shown in FIGS. 3A to 3C, a representative value for driving load, when contacting, in the constant speed feed axis (X axis) increases repeating increase and decrease in a wave form with a cycle corresponding to a frequency of reciprocal movement in the Y-axial direction. As a result, a large load fluctuation rate (inclination in load increase) can be obtained without making large a biting rate or a thrust-in speed, which makes it possible to accurately determine contact.

It should be noted that, in FIGS. 3A to 3C, FIG. 3A indicates a representative value for driving load in the constant speed feed axis (X axis), FIG. 3B indicates an X-axial position, and FIG. 3C indicates a position in an axial direction for reciprocal movement (Y axis) reciprocally. Also a corrugated line in FIG. 3A indicates a representative value for driving load when reciprocal movement in the Y-axial direction is not executed.

Next detailed description is made for an example of contact determination and contact position identification. Generally, a representative value for load fluctuation in the constant speed feed axis (X axis) is substantially constant before start of contact and does not change largely, but after start of contact, load fluctuation substantially synchronized to reciprocal movement appears in the representative value due to effect by reciprocal movement in the reciprocal movement axis, namely in the Y-axial direction. Herein it is assumed that a specified value for load fluctuation change rate per unit time t is Its. Namely, it is determined that contact has occurred when a load fluctuation rate $\Delta I$ per unit time $t \geq Its$, and the instruction for movement in the axial direction is invalidated, or the tool 3 is reversely moved by a certain range in the X-axial direction for reducing effects over the work W to effect a non-contact state.

Then it is diagnosed from how many steps ahead the load fluctuation has been generated. The reference specified value Its is set according to the minimum load fluctuation inclination in contact, and for this reason it never occurs that the contact starts before the sampled and stored time. So a determination time for load fluctuation is made shorter step by step to finally decide when the contact occurred. Thus the contact time is detected, and the feedback position stored at the point of time is regarded as a contact position.

With the operations, contact detection and contact position detection are executed with high precision and high reliability without giving any biting damage to the work and also without giving any damages such as chipping to tools such as a bite.

Figure 4:
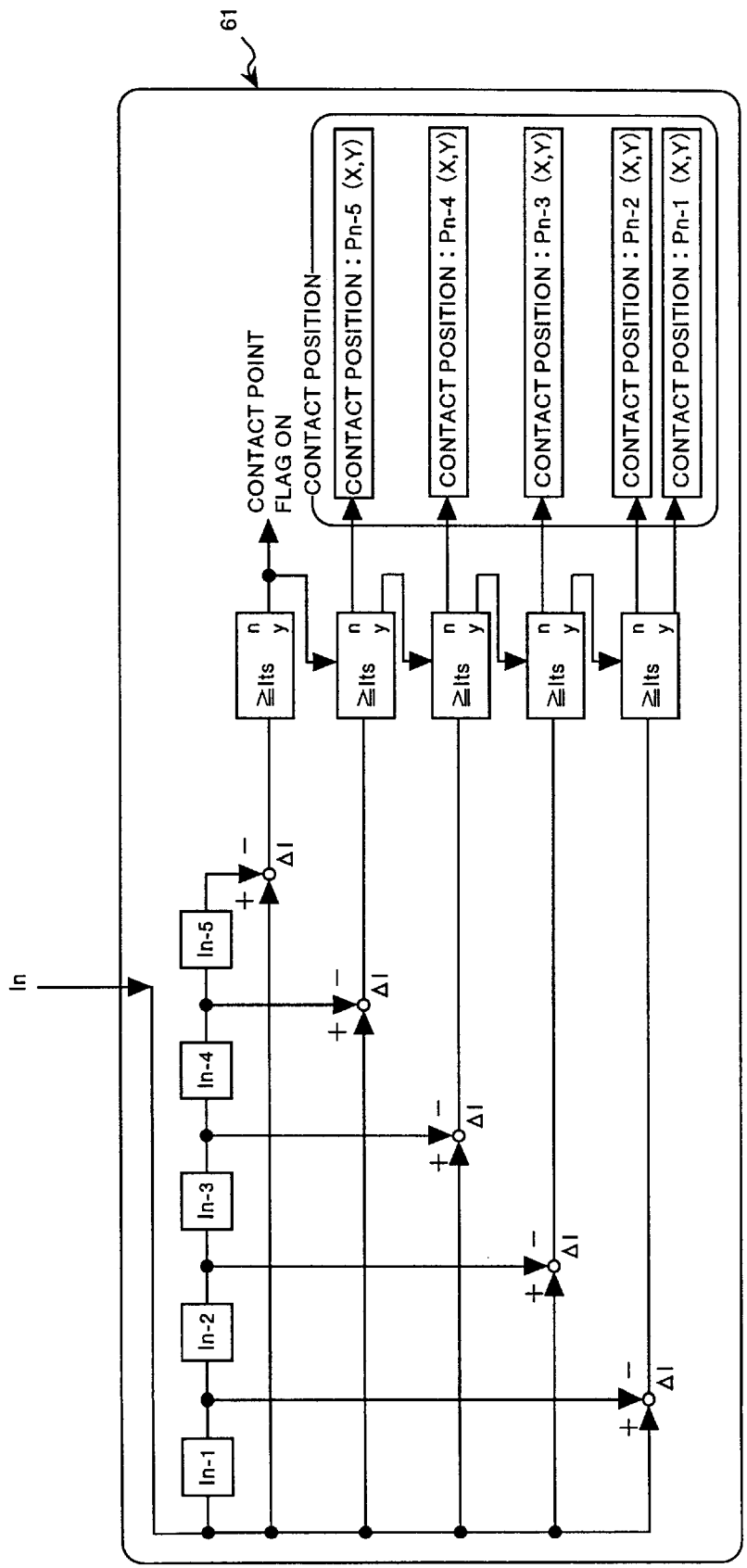
FIG. 4 is a block diagram showing a particular example of the contact position detector for figuring out and determining a contact position.

Next description is made for an example of the operation for figuring out a contact position with reference to FIG. 4. In this example, the contact position detector 61 stores therein a specified sampling number of current instruction values Ix*, X-axial positional data Px, and Y-axial positional data Py. In this data storage, it is assumed that data sampled last is n, data sampled one cycle before the last sampling time is n-1, data sampled two sampling cycles before the last sampling time is n-2, data sampled three sampling cycles before the last sampling time is n-3, data sampled four sampling cycles before the last sampling time is n-4, and data sampled five sampling cycles before the last sampling time is n-5.

Determination of contact is made by checking whether difference between a current value $I_n$ sampled last and a current value $I_{n-5}$ sampled five sampling cycles before the last sampling time: $\Delta I=(I_n)-(I_{n-5})$ is larger than the specified value Its or not, and if the difference $\Delta I=(I_n)-(I_{n-5}) \geq Its$, it is determined that contact has occurred, and a contact point flag is turned ON.

When the contact point flag is turned ON, the operation for figuring out the contact position is started. When figuring out a contact position, at first determination is made as to whether a difference between the current value In sampled last and a current value $I_{n-4}$ sampled four sampling cycles before the last sampling time: $\Delta I=(I_n)-(I_{n-4})$ is larger than the specified value Its or not, and if it is determined that the $(I_n)-(I_{n-4})$ is less than the specified value Its, the contact point is determined as $Px_{n-5}$, $Py_{n-5}$.

In contrast, if it is determined that the $(I_n)-(I_{n-4}) \geq Its$, it is determined that the contact position is before the point of $(Py_{n-5}, Px_{n-5})$, and then determination is made as to whether a difference between the current value $I_n$ sampled last and a current value $I_{n-3}$ sampled three sampling cycles before the last sampling time: $\Delta I=(I_n)-(I_{n-3})$ is larger than the specified value Its or not, and if it is determined that the $(I_n)-(I_{n-3})$ is less than the specified value Its, the contact position is identified as $Px_{n-4}$, $Py_{n-4}$.

If it is determined that $(I_n)-(I_{n-3}) \geq Its$, it is determined that contact has occurred before the position of $(Px_{n-4}, Py_{n-4})$, and then determination is made as to whether the difference between the current value In sampled last and a current value $I_{n-2}$ sampled two sampling cycles before the last sampling time: $\Delta I=(I_n)-(I_{n-2})$ is larger than the specified value Its or not, and when it is determined that the $(I_n)-(I_{n-2})$ is less than the specified value Its, the contact position is identified as $Px_{n-3}$, $Py_{n-3}$.

If it is determined that $(I_n)-(I_{n-2}) \geq Its$, it is determined that contact has occurred before the position of $(Px_{n-3}, Py_{n-3})$, and the determination is made as to whether the difference between the current value $I_n$ sampled last and a current value $I_{n-1}$ sampled one sampling cycle before the last sampling time: $\Delta I_{32\ (In)}-(I_{n-2})$ is larger than the specified value Its or not, and if it is determined that the $(I_n)-(I_{n-1})$ is less than the specified value Its, the contact position is identified as $Px_{n-2}$, $Py_{n-2}$.

By figuring out the contact position as described above, and when it is determined that $(I_n)-(I_{n-2}) \geq Its$, the contact position is identified as $Px_{n-1}$, $Py_{n-1}$.

As another example of determination of a contact position, by previously measuring the current instruction value Ix* and storing the measured current instruction value Ix* together with positional data for the tool 3 as a reference change rate $I_0$, it is possible to determine that contact has occurred when a difference between the reference change rate $I_0$ and the current instruction value $Ix^*((Ix^*)-(I_0))$ exceeds a specified value and to identify a contact point according to a result of determination of contact.

Figure 5:
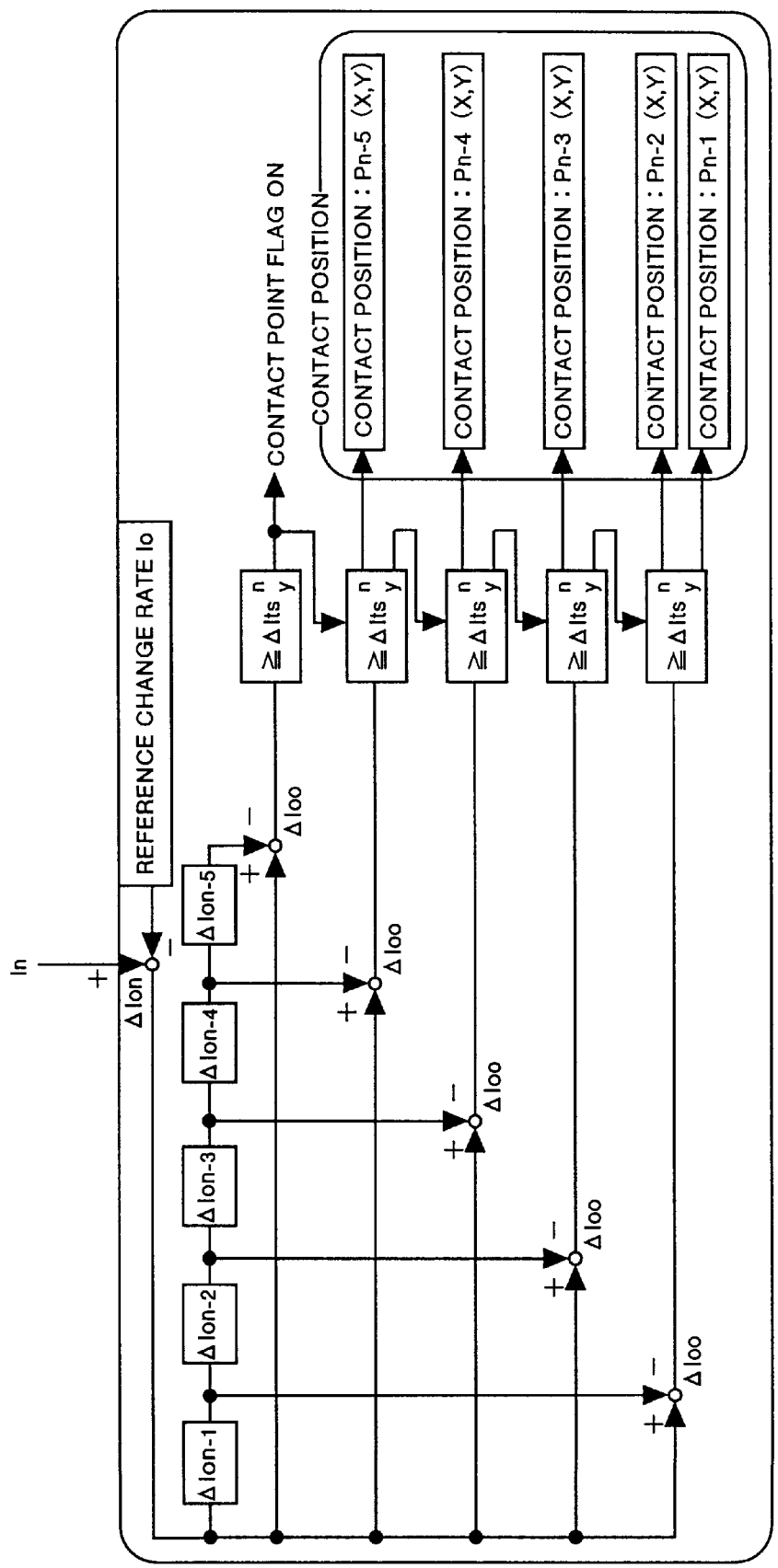
FIG. 5 is a block diagram showing another example of the contact position detector for figuring out and determining a contact position.

Also as shown in FIG. 5, assuming that a difference between the reference change rate Io and the current instruction value $Ix^*(\Delta I_0=(Ix^*)-(I_0))$ is a representative value for driving load equivalent to the sampling current value $I_n$ in FIG. 4, it is possible to figure out a contact position, like in the case shown in FIG. 4, by determining whether a difference between a current difference $\Delta I_{On}$ sampled last and a current difference $\Delta I_{On-5}$ sampled five sampling cycles before the last sampling time, namely a change rate $\Delta I_{OO}$ of the difference $(\Delta I_{OO}=(\Delta I_{On})-(\Delta I_{nO-5}))$ is not less than a specified value $\Delta Its$ or not, and determining, if it is determined that the difference change rate $(\Delta I_{OO}=(\Delta I_{On})-(\Delta I_{On-5})) \geq \Delta Its$, that contact has occurred.

In the embodiment of the present invention described above, when the tool 3 contacts the work W, load fluctuation (change of the current instruction value Ix* in FIG. 3A) substantially synchronized to a frequency of reciprocal movement in the Y-axial direction is generated. As the frequency of reciprocal movement in the Y-axial direction is known, it is possible to determine that contact has occurred when the current instruction value Ix* is passed through an IIR filter or the like having a substantially same frequency as that of the reciprocal movement and if the current instruction value Ix* fluctuates in a substantial synchronism to the frequency of reciprocal movement.

Also it is possible to previously anticipate a zone in which a load fluctuation component increases from a positional instruction for reciprocal movement in the Y-axial direction. Assuming that a cycle of reciprocal movement in the Y-axial direction is T, it can be anticipated that the current instruction value Ix* increases in a zone of 4/T without fail when contact occurs. For this reason, by executing the sampling as described above, it is possible to detect contact in a stable state even on an axis where other components for external disturbance are large.

Figure 6:
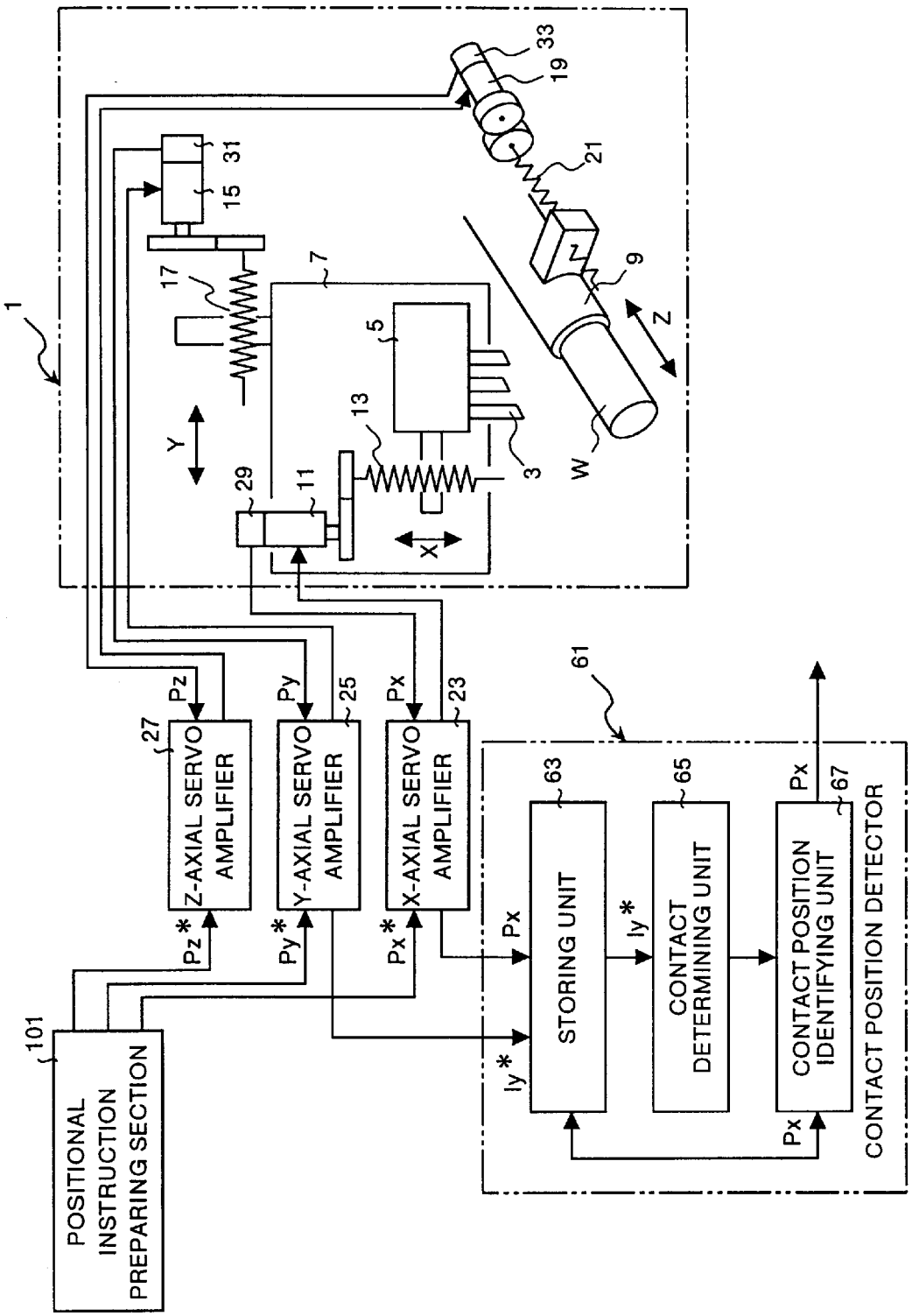
FIG. 6 is an explanatory view showing configuration in Embodiment 2 of the contact detecting apparatus according to the present invention.
Figure 7:
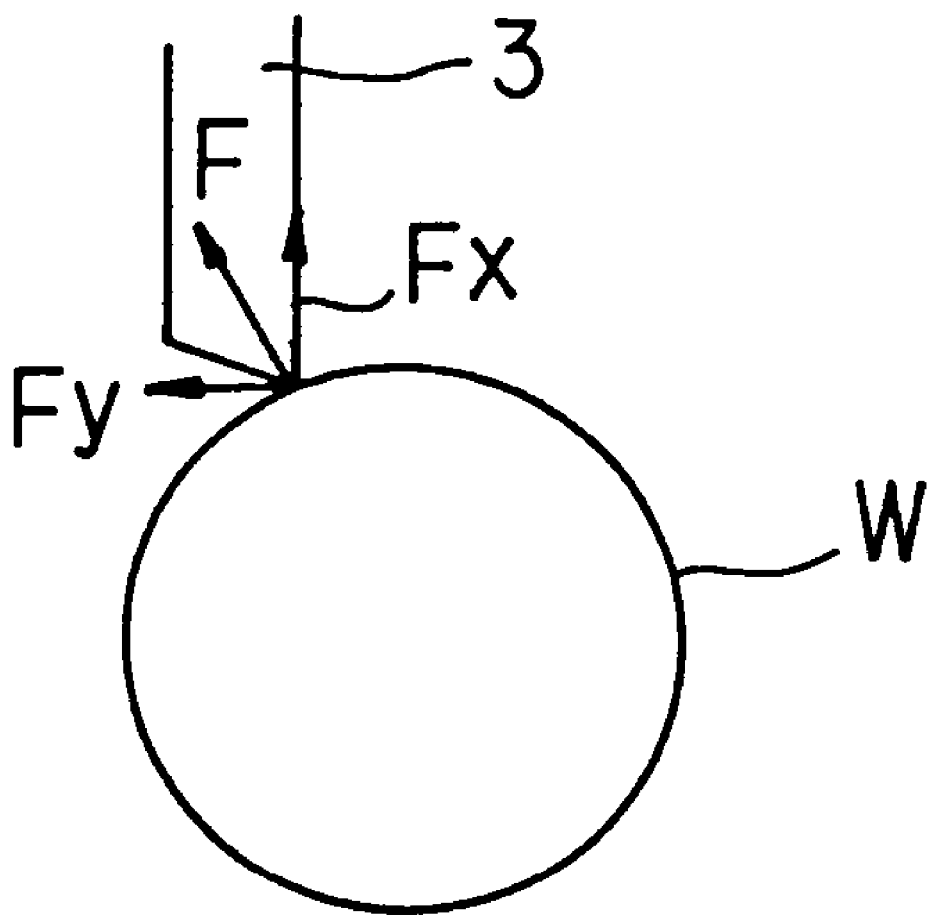
FIG. 7 is a side view showing contact between a tool and a work in Embodiment 2.

FIG. 6 to FIG. 8 show Embodiment 2 of the contact detecting apparatus according to the present invention. FIG. 6 is a block diagram showing the Embodiment 2, and in FIG. 6, the same reference numerals are assigned to the same sections as those in FIG. 1 and description thereof is omitted herein.

In this embodiment, an axial control unit comprising the positional instruction preparing section 101 and the X-axial servo amplifier 23 provides controls for moving the X-axial tool base 5 in the X-axial direction by superimposing reciprocal movement in the X-axial direction with a specified frequency and a specified amplitude to movement of the tool 3 at a constant speed in the X-axial direction for making the tool 3 approach an outer peripheral surface of a rod-shaped work W when detecting contact.

A frequency of the reciprocal movement varies according to such factors as a type of the tool 3, materials or size of the work W, but generally is in a range from 10 to 40 Hz and the amplitude is preferably in a range from 30 to 60 $\mu$m. It should be noted that, like in Embodiment 1, the frequency and amplitude can changeably be set according to such factors as a type of the tool 3, materials or size of the work W. As for axial controls for the Y axis, the Y-axial tool base 7 is kept stopped in the servo-on start.

An axis as an object for detection of load fluctuation in this embodiment is Y axis (stop axis), and the storing unit 63 in the contact position detector 61 stores as a representative value for driving load a speed integration instruction value, a current instruction value, or a current feedback value in PI controls for a servo unit for driving in the Y-axial direction as an object for detection of load fluctuation, and also stores positional feedback value (positional data) in the X-axial direction Px in time series. Herein the storing unit 63 stores a representative value for driving load in the Y-axial direction (for instance, a current instruction value Iy*) and X-axial positional data Px as a pair with a time tag attached thereto.

The contact determining unit 65 fetches a representative value for driving load in the Y-axial direction from the storing unit 63 basically during movement of the tool 3 for detection of contact, detects a load fluctuation component in the Y-axial direction from this representative value for driving load, and determines that the tool 3 has contacted the work W from this load fluctuation component.

A representative value for driving load on the stop axis (in the Y-axial direction) is kept constant at substantially zero (0) before contact, and as shown in FIG. 7, when the tool 3 contacts an outer peripheral surface of the work W in the X-axial direction, a component for the Y-axial direction Fy of a contact stress F is generated in response to an inclination (arc) of an outer peripheral surface of the work W. It should be noted that, in FIG. 7, Fx indicates an X-axial component of the contact stress F. When the Y-axial component Fy is generated, if the tool 3 contacts an outer peripheral surface of the work W, a representative value for driving load on the Y axis in the servo-on state starts changing, and contact between the tool 3 and the work W can be detected according to this component for fluctuation.

As the Y axis is a stop axis, a representative value for driving load in the Y-axial direction does not contain an external disturbance due to mechanical factors such as a feed screw system or the like. Because of this feature, effect of mechanical external disturbance due to movement in an axial direction does not appear in contact determination, and even minute load fluctuation can accurately be detected, so that incorrect determination because of load fluctuation due to external disturbance is never made.

Also in this embodiment, a large biting damage is not given to a work, and no damage such as chipping is given to a tool such as a bite, so that contact detection and contact position detection can be made with high precision and high reliability.

Further the X-axial tool base 5 is moved toward an outer peripheral surface of the work W by superimposing reciprocal movement in the X-axial direction with a specified frequency and a specified amplitude to movement in the X-axial direction at a specified speed, so that a representative value for driving load in the Y-axial direction increases repeating increase and decrease in a corrugated form with a cycle corresponding to a frequency of reciprocal movement in the X-axial direction as shown in FIG. 8, and the load fluctuation is amplified by the corrugation. As a result, like in Embodiment 1, contact detection can more accurately be executed according to a load fluctuation rate (inclination of load increase) without giving a large biting damage to the work or without raising the thrust-in speed.

Figure 8A:
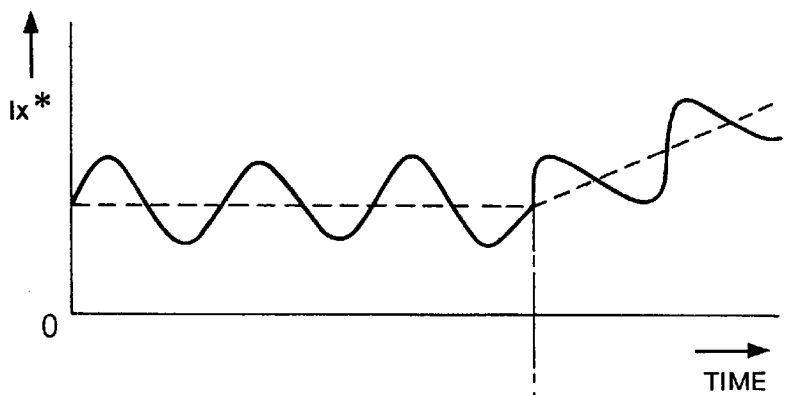
FIG. 8A is a graph showing characteristics of an X-axial representative value for driving load in Embodiment 2.
Figure 8B:
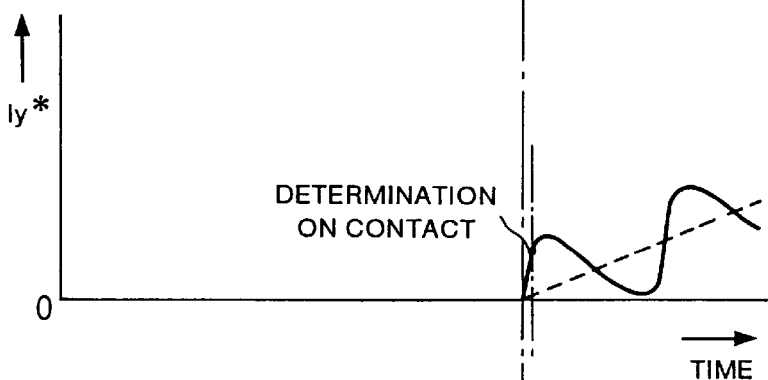
FIG. 8B is a graph showing characteristics of a Y-axial representative value for driving load.
Figure 8C:
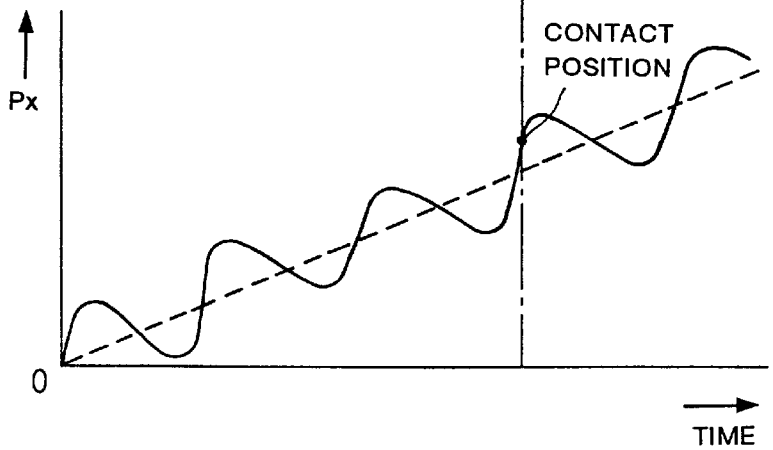
FIG. 8C is a graph showing X-axial positional characteristics.
Figure 8D:
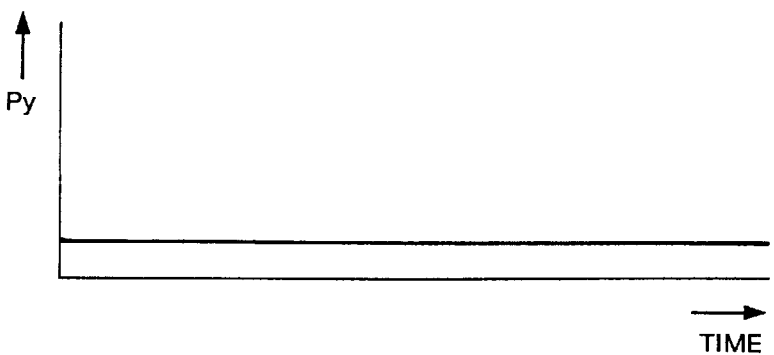
FIG. 8D is a graph showing Y-axial positional characteristics.
Figure 10:
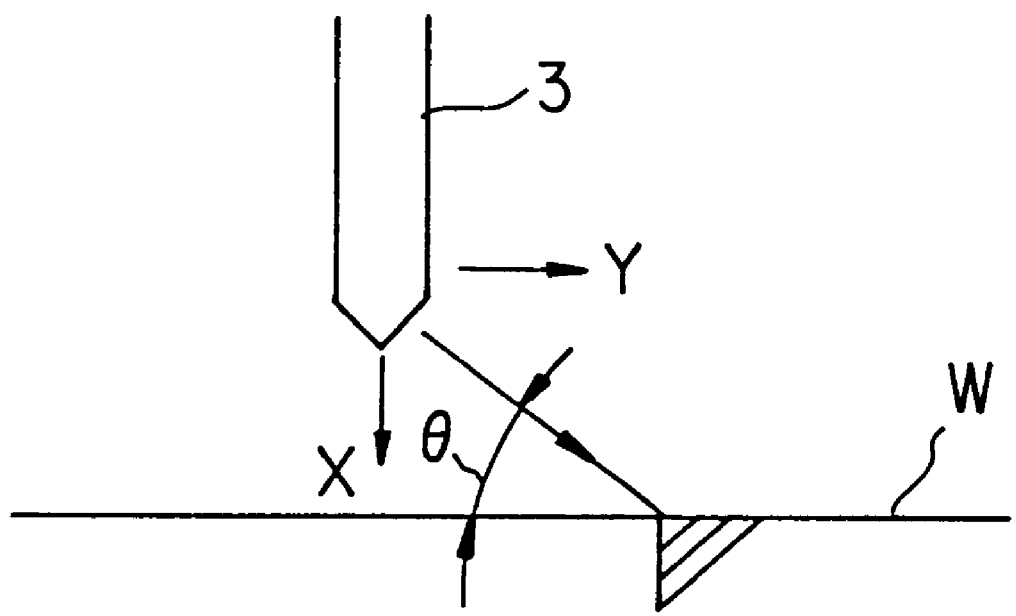
FIG. 10 is a side view showing how contact between a tool and a work proceeds in Embodiment 3.

It should be noted that, in FIGS. 8A to 8D, FIG. 8A shows a representative value for driving load in a case of constant speed feed+reciprocal movement axis (X axis), FIG. 8B shows a representative value in the stop axis (Y axis), FIG. 8C shows positional characteristics in the X-axial direction, and FIG. 8D shows positional characteristics in the Y-axial direction respectively. In each figure, a corrugated line indicates the characteristics in a case where reciprocal movement in the X-axial direction is not made.

It should be noted that, also in Embodiment 2, contact determination and identification of a contact position can be made like in Embodiment 1, and the same effects as those in Embodiment 1 can be obtained.

FIG. 9 to FIG. 12 show Embodiment 3 of the contact detecting apparatus according to the present invention. FIG. 9 is a block diagram showing Embodiment 3, and in FIG. 9, the same reference numerals are assigned to sections corresponding to those in FIG. 1 and description thereof is omitted herein.

In this embodiment, the axial control unit comprising the positional instruction preparing section 101, X-axial servo amplifier 23, Y-axial servo amplifier 25 moves the X-axial tool base 5 at a specified speed in the X-axial direction and also moves the Y-axial tool base 7 in the Y-axial direction by superimposing reciprocal movement in the Y-axial direction with a specified frequency and a specified amplitude to movement at a specified speed in the Y-axial direction when detecting contact for making the tool 3 approach the work W.

With the operation, the tool 3 approaches and contacts the work W with a certain inclination angle $\theta$ (Refer to FIG. 10) against the work W because of synthesis of movement of the tool 3 in that X-axial direction with movement thereof in the Y-axial direction. This inclination angle θ is set to an arbitrary value according to a ratio of a feed speed in the X-axial direction vs that in the Y-axial direction.

Because of the fact that the tool 3 approaches and contacts the work W with a certain inclination angle θ against the work W, even if the tool 3 has a sharp blade tip such as that of a parting tool, it is possible to insure a larger initial contact area as compared to that in a case where the tool 3 is contacted in the vertical direction to (At right angles against) the work W, so that large load fluctuation can be generated with the same biting rate.

With the features as described above, also in this embodiment, contact detection and contact position detection can be made with high precision and high reliability without giving a large biting damage to a work and also without giving any damage such as chipping to a tool such as a bite.

Either X axis or Y axis may be specified as an object axis for detection of load fluctuation in this embodiment, and an axis with larger load fluctuation may be selected. For this reason, when detecting contact, the storing unit 63 stores therein a representative value for driving load in the X-axial direction or in the Y-axial direction as an object for detection of load fluctuation and X-axial positional data Px as a pair with a time tag attached thereto.

In this embodiment, reciprocal movement is superimposed to feed in the Y-axial direction, so when the tool 3 contacts an object for contact, as shown in FIG. 11, a representative value for driving load in the X-axial direction increases repeating increase and decrease in a corrugated form with a cycle corresponding to a frequency of reciprocal movement in the Y-axial direction, and the load fluctuation increases according to the corrugation. As a result, contact detection can more accurately be executed according to load fluctuation in the X-axial direction without making the biting rate larger or without raising the thrust-in speed.

Figure 11A:
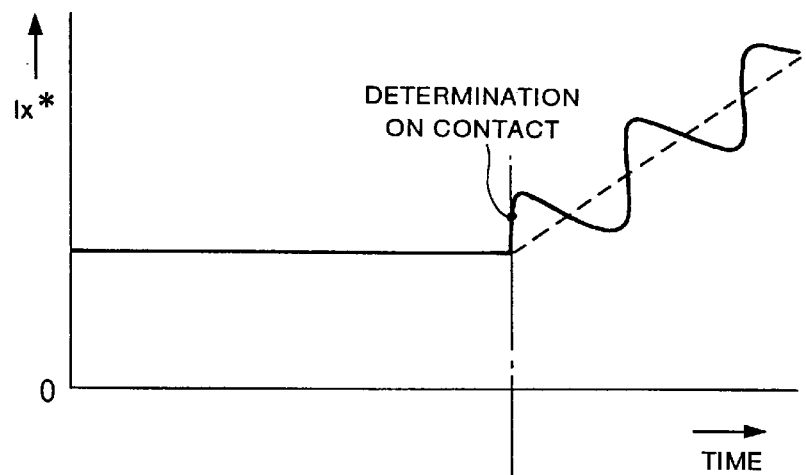
FIG. 11A is a graph showing characteristics of an X-axial representative value for driving load in Embodiment 3.
Figure 11B:
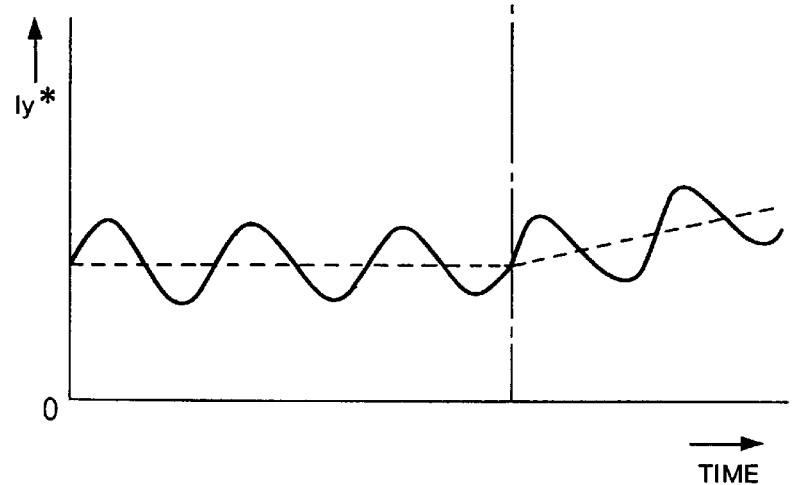
FIG. 11B is a graph showing characteristics of a Y-axial representative value for driving load.

It should be noted that, in FIGS. 11A and 11B, FIG. 11A shows a representative value for driving load in the X-axial direction, and FIG. 11B shows a representative value for driving load in the Y-axial direction. In each figure, a corrugated line indicates a case where reciprocal movement in the Y-axial direction is not made.

Also in this embodiment, an optimal value of a frequency reciprocal movement varies according to a type of the tool 3, and materials or size of the work W, but is generally in a range from 10 to 40 Hz, and the amplitude is preferably in a range from 30 to around 60 μm. The frequency and amplitude can changeably be set according to a type of the tool 3 and materials or size of the work W by changing the parameters.

In this embodiment, reciprocal movement may be superimposed not to feed in the Y-axial direction but to feed in the X-axial direction, and in this case, a representative value for driving load in the Y-axial direction in contact increases repeating increase and decrease in a corrugated form with a cycle corresponding to a frequency of reciprocal movement in the X-axial direction, and load fluctuation increases according to the corrugation. As a result, contact determination can accurately be executed according to load fluctuation in the Y-axial direction without making larger the biting rate or without raising the thrust-in speed.

Also reciprocal movements in both the X-axial direction and Y-axial direction may be added by superimposing reciprocal movement in the X-axial direction to a constant speed feed in the X-axial direction and also superimposing reciprocal movement in the Y-axial direction to a constant speed feed in the Y axial direction. In this case, as shown in FIG. 12, because of synergetic effect between reciprocal movement in the X-axial direction and that in the Y-axial direction, load fluctuation due to corrugation further increases, and contact determination can further accurately be executed according to load fluctuation in the X-axial direction or in the Y-axial direction without making larger the biting rate or without raising the thrust-in speed.

Figure 12A:
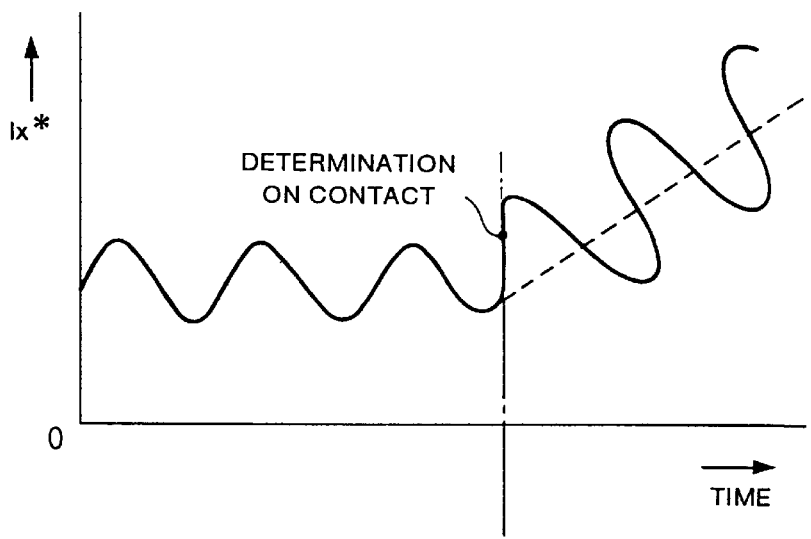
FIG. 12A is a graph showing an X-axial representative value for driving load in Embodiment 3.
Figure 12B:
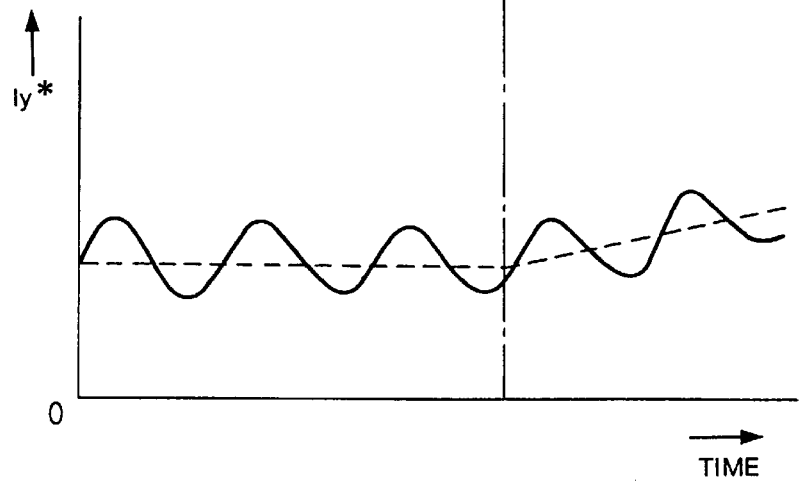
FIG. 12B is a graph showing characteristics of a Y-axial representative value for driving load.

It should be noted that, in FIGS. 12A and 12B, FIG. 12A shows a representative value for driving load and FIG. 12B shows a representative value for driving load in the Y-axial direction.

In either case, a frequency of reciprocal movement on each axis varies according to a type of the tool 3 and materials or size of the work W, but is generally in a range from 10 to 40 Hz, and the amplitude is preferably in a range from 30 to around 60 μm. It should be noted that, like in Embodiment 1, the frequency and amplitude can changeably be set according to a type of the tool 3 and materials or size of the work W by setting an appropriate value for each parameter.

Also in this embodiment, contact determination and contact position identification can be make like in Embodiment 1.

Figure 13:
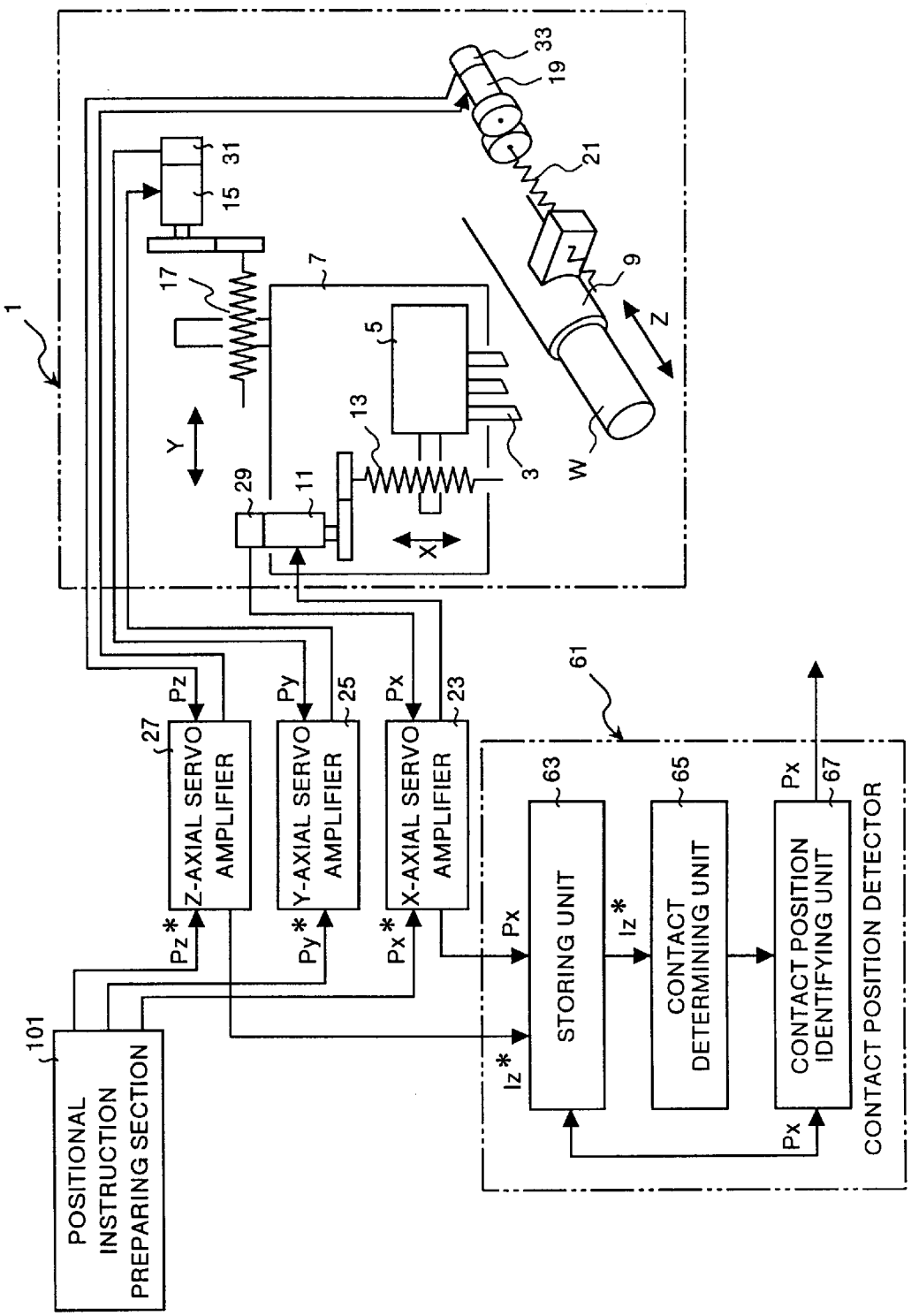
FIG. 13 is an explanatory view showing configuration in Embodiment 4 of the contact detecting apparatus according to the present invention.

FIG. 13 and FIG. 14 show Embodiment 4 of the contact detecting apparatus according to the present invention.

FIG. 13 is a block diagram showing configuration in Embodiment 4, and the same reference numerals are assigned to sections corresponding to those in FIG. 1, and description thereof is omitted herein.

In this embodiment, an axial control unit comprising the positional instruction preparing section 101, X-axial servo amplifier 23, Y-axial servo amplifier 25, and Z-axial servo amplifier 27 moves, when detecting contact, the X-axial tool base 5 at a specified speed in the X-axial direction for making the tool 3 approach an outer peripheral surface of the work W, and also reciprocally moves the Y-axial tool base 7 at a specified frequency and a specified amplitude, and further moves the work W with the Z-axial work head 9 at a specified speed in the Z-axial direction.

A frequency of reciprocal movement in the Y-axial direction varies according to a type of the tool 3 and materials of size of the work W, and is generally in a range from 10 to 40 Hz, and the amplitude is preferably in a range from 30 to around 60 μm. It should be noted that, like in Embodiment 1, the frequency and amplitude can changeably be set according to a type of the tool 3 and materials or size of the work by setting each parameter to an appropriate value.

An object axis for detection of load fluctuation in this embodiment is the Z axis (work axis), and the storing unit 63 in the contact position detector 61 stores as a representative value for driving load, when detecting contact, a speed integration instruction value, a current instruction value, or a current feedback value in PI controls for a servo unit for driving in the Z-axial direction as an object axis for detection of load fluctuation, and also stores positional feedback value (positional data) Px in the X-axial direction in time series. In other words, the storing unit 63 stores therein a representative value for driving load in the Z-axial direction (for instance, a current instruction value Iz*) and positional data Px as a pair with a time tag attached thereto.

The contact determining unit 65 fetches a representative value for driving load in the Z-axial direction from the storing unit 63 basically during movement of the tool or the work for detecting contact, detects a load fluctuation component in the Z-axial direction from this representative value for driving load, and determines contact between the tool 3 and the work W according to the load fluctuation component.

This embodiment is effective in a case where, as the main shaft for a work is in the servo-off state, even if the tool 3 contacts the work W, the work W rotates due to the contact and large load fluctuation is not generated in the X-axial or Y-axial direction, and also in this case, contact determination can accurately be executed.

Also as described above, when the tool 3 is moved at a constant speed in the X-axial direction, the tool 3 is also reciprocally moved in the Y-axial direction (lateral direction) with a specified frequency to make the tool 3 contact the work W, and like in Embodiment 1, the tool 3 repeats contact to and separation from the work W when contact is started.

Figure 14A:
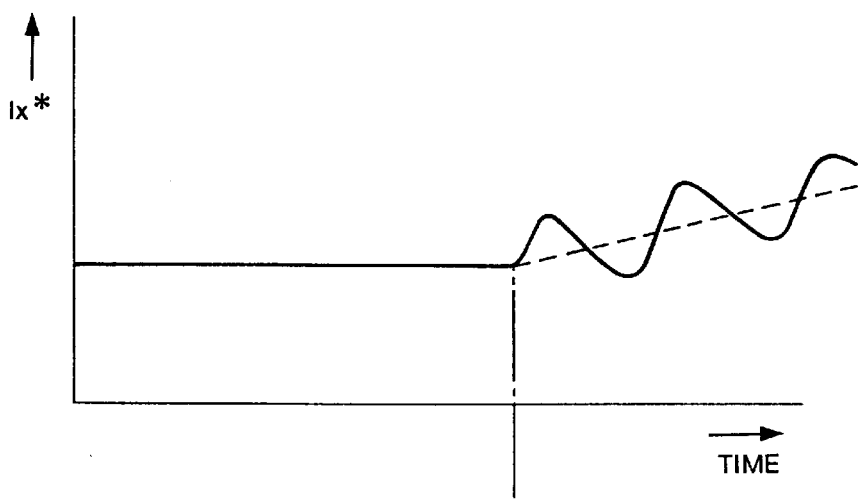
FIG. 14A is a graph showing characteristics of an X-axial representative value for driving load in Embodiment 4.
Figure 14B:
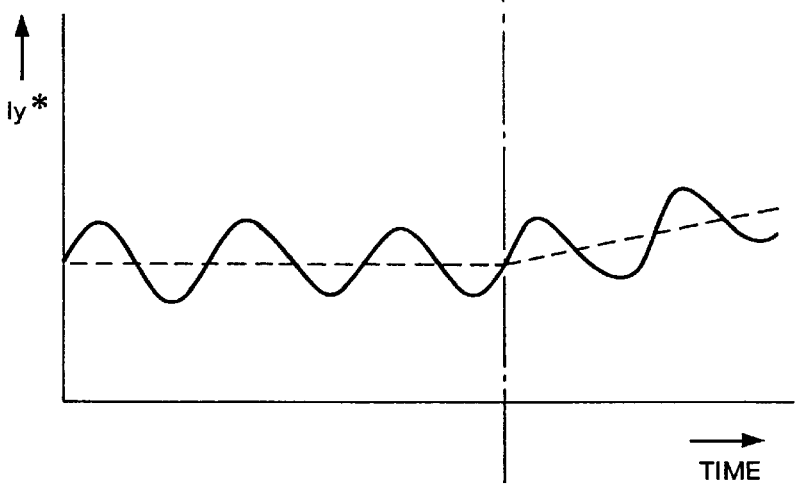
FIG. 14B is a graph showing characteristics of a Y-axial representative value for driving load.
Figure 14C:
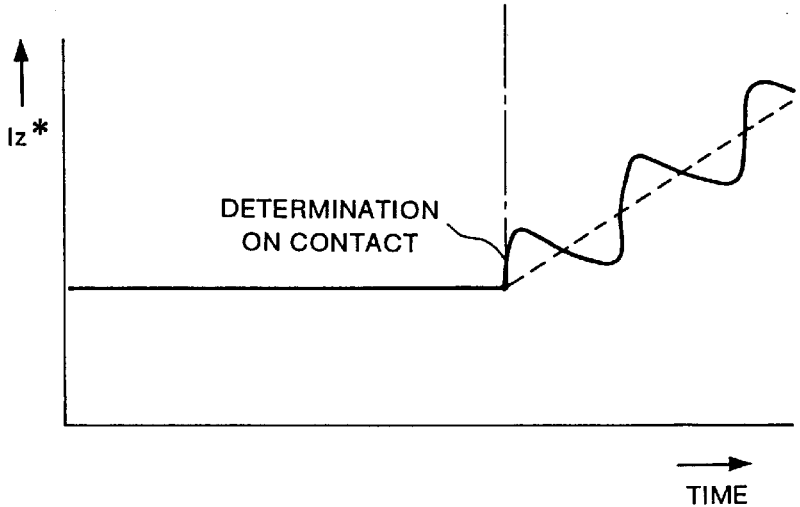
FIG. 14C is a graph showing characteristics of a Z-axial representative value for driving load.

With this operation, a representative value for driving load in contact in the Z-axial direction increases repeating increase and decrease in a corrugated form with a cycle corresponding to a frequency of reciprocal movement in the Y-axial direction as shown in FIGS. 14A to 14C, and the load fluctuation increases according to the corrugation. As a result, contact determination can accurately be executed according to the load fluctuation rate (inclination in load increase) without making larger the biting rate or without raising the thrust-in speed.

It should be noted that, in FIGS. 14A to 14C, FIG. 14A shows a representative value for driving load in the X-axial direction, FIG. 14B shows a representative value for driving load in the Y-axial direction, and FIG. 14C shows a representative value for driving load in the Z-axial direction. In each figure, the corrugated line indicates characteristics in a case where reciprocal movement in the Y-axial direction is not executed.

In this embodiment, the tool 3 may be reciprocally moved in the X-axial direction at a specified frequency while being moved at a contact speed in the X-axial direction, and further reciprocal movement of the work W may be superimposed to movement thereof in the Z-axial direction at a specified frequency to amplify load fluctuation in the Z-axial direction with the reciprocal movements.

Also it should be noted that, also in this embodiment, contact determination and identification of a contact position can be made like in Embodiment 1.

FIG. 15 and FIG. 16 show Embodiment 5 of the contact detecting apparatus according to the present invention.

FIG. 15 is a block diagram showing Embodiment 5, and in FIG. 15, the same reference numerals are assigned to sections corresponding to those in FIG. 1 and description thereof is omitted herein.

In this embodiment, like in Embodiment 1, the axial control unit comprising the positional instruction preparing section 101, X-axial servo amplifier 23, and Y-axial servo amplifier 25 moves, when detecting contact, the X-axial tool base 5 together with the tool 3 at a specified speed in the X-axial direction approaching the outer surface of the work W as an object for contact for making the tool 3 approach an outer peripheral surface of the work W, and at the same time the Y-axial tool base 7 is reciprocally moved at a specified frequency and a specified amplitude.

An object axis for detection of load fluctuation in this embodiment is xaxis (constant feed axis) and Yaxis (reciprocal movement axis), and the storing unit 63 stores therein as a representative value for driving load a speed integration instruction value, a current instruction value, or a current feedback value in PI controls for a servo unit for driving in the X-axial direction and in the Y-axial direction as an object for detection of load fluctuation, and also stores a positional feedback value (positional data) in the X-axial direction in time series. In other words, the storing unit 63 stores representative values for driving load in the X-axial direction as well as in the Y-axial direction (for instance, current instruction values Ix* and Iy*) and positional data Px as a pair with a time tag attached thereto.

The contact position detector 61 has a driving load representative value synthesizing unit 69. The driving load representative value synthesizing unit 69 adds a representative 5 value for driving load in the X-axial direction to a representative value for driving load in the Y-axial direction each having the same time tag attached thereto (Ix*+Iy*) and outputs the sum to the contact determining unit 65.

The contact determining unit 65 receives, when detecting contact, a sum of the representative value for driving load in the X-axial direction and a representative value for driving load in the Y-axial direction during movement of the tool, detects a load fluctuation component according to the sum, and determines according to the load fluctuation component that the tool 3 has contacts the work W.

In this embodiment, contact determination is made according to a load fluctuation component based on a sum of a representative value for driving load in the X-axial direction and that in the Y-axial direction, so that, as shown in FIG. 15, the load fluctuation component becomes larger as compared to that in a case of one axis, and contact determination can be made more accurately. Also the embodiment is effective in a case where inertia of a tool base is large and an amplitude of reciprocal movement in the Y-axial direction can not be made larger, or in a case where a frequency is high and an amplitude is small. This embodiment is also effective in a case where an axis on which a large driving load fluctuation appears is unknown.

Figure 16A:
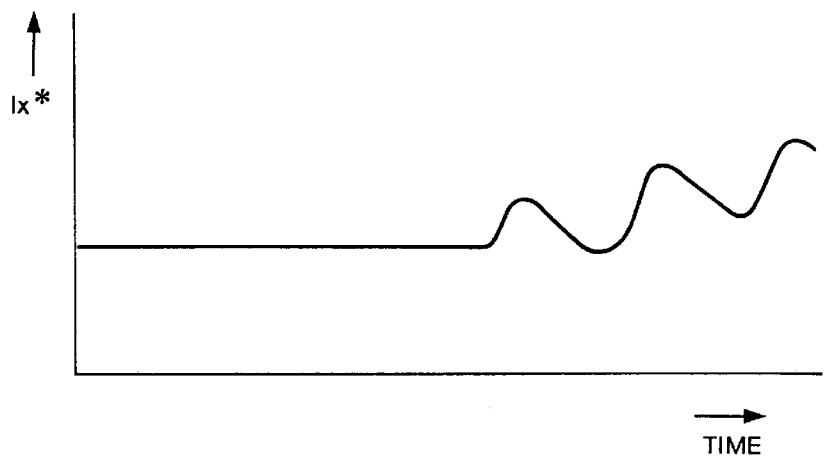
FIG. 16A is a graph showing characteristics of an X-axial representative value for driving load in Embodiment 5.
Figure 16B:
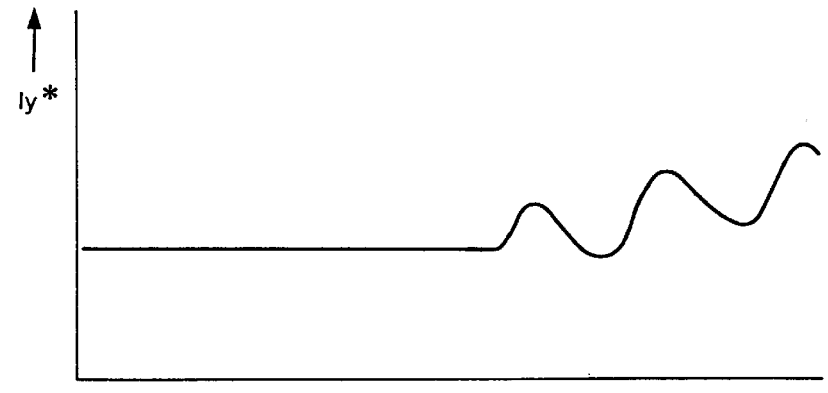
FIG. 16B is a graph showing characteristics of a Y-axial representative value.
Figure 16C:
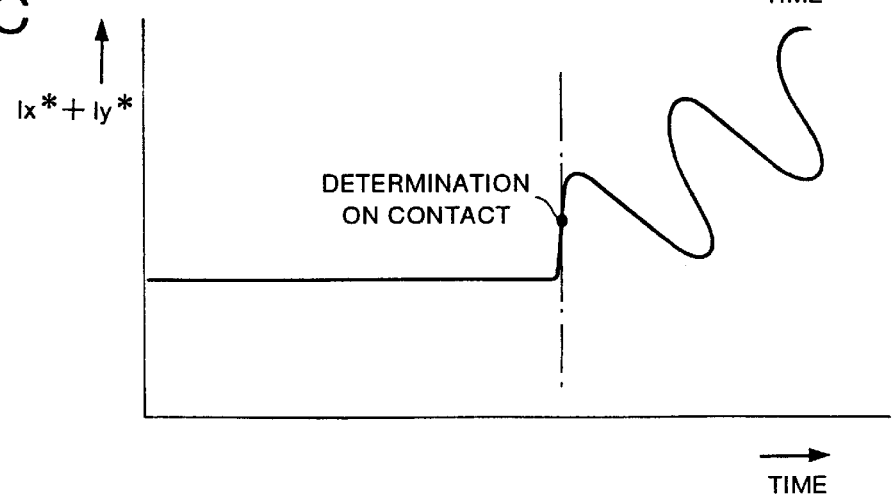
FIG. 16C is a graph showing characteristics of a sum of the X-axial and Y-axial representative values.

It should be noted that, in FIGS. 16A to 16C, FIG. 16A shows a representative value for driving load in the X-axial direction, FIG. 16B shows a representative value for driving load in the Y-axial direction, and FIG. 16C shows a sum of a representative value for driving load in the X-axial direction and that in the Y-axial direction.

Embodiment 5 can be applied to configuration of the contact detecting apparatus according to any of Embodiments 2 to 4, and a sum of representative values for driving load in different axes is not limited to one of a representative value for driving load in the X-axial direction and that in the Y-axial direction, and in Embodiment 4, a sum of representative values for driving load in two axial directions of X-axial direction and Z-axial direction, of the Y-axial direction and the Z-axial direction, or a sum of representative values for driving load in three axial direction of the X-axial direction, Y-axial direction, and Z-axial direction are allowable.

It should be noted that contact determination and identification of a contact position can be executed like in Embodiment 1.

As clearly understood from the above description, with the contact detecting method according to the invention, a movable body is moved in the first direction at a specified speed to make the movable body approach the object for contact and at the same time is reciprocally moved in the second direction, so that load fluctuation in the first direction can be amplified in contact, whereby contact can accurately be detected according to load fluctuation in the first direction. Also there is provided the advantage that damages caused by metal fatigue due to repeated use of a tool or the like can be reduced.

With the contact detecting method according to another aspect of the present invention, in a state where movement of the movable body in the second direction is stopped and at the same time the movable body is moved in the first direction at a specified speed to make the movable body approach the object for contact, fluctuation of load to this movable body in the second direction in stopped state is detected and contact between the movable body and the object for contact is detected according to the load fluctuation, so that contact can accurately be detected according to even minute load fluctuation without being affected by mechanical external disturbance.

With the contact detecting method according to the present invention, in the state where movement of the movable body in the second direction is stopped and at the same time the movable body is moved in the first direction at a specified speed to make the movable body approach the object for contact by superimposing reciprocal movement to movement of the movable body, fluctuation of load to this movable body in the second direction in stopped state is detected, and a contact between the movable body and the object for contact is detected according to this load fluctuation, so that it is possible to accurately detect contact even according to minute load fluctuation and also to amplify load fluctuation in the second direction in contact without being affected by mechanical external disturbance, and as a result contact can accurately be detected according to load fluctuation in the second direction. Also there is provided the advantage that damages caused by metal fatigue due to repeated contact by a tool or the like can be reduced.

With the contact detecting method according to another aspect of the present invention, in a state where the movable body is moved in the first direction and in the second direction at a specified speed respectively to make the movable body approach the object for contact, fluctuation of load to the movable body in the first direction or in the second direction is detected, and contact between the movable body and the object for contact is detected according to the load fluctuation, so that a contact angle of the movable body against the object for contact can be changed according to a ratio of a speed in the first direction vs a speed in the second direction, and large load fluctuation can be obtained by setting the contact angle to an appropriate value, which enables contact detection with high precision.

With the contact detecting method according to another aspect of the invention, in a state where the movable body is moved at a specified speed in the first direction as well as in the second direction to make the movable body approach the object for contact by superimposing reciprocal movement in the first direction or in the second direction to movement of the movable body, fluctuation of load to the movable body in the first direction or in the second direction is detected, and contact between the movable body and the object for contact is detected according to the load fluctuation, so that a contact angle of the movable body against the object for contact can be changed according to a ratio of a speed in the first direction vs that in the second direction, and by setting the contact value to an appropriate value, larger load fluctuation can be obtained, contact detection with high precision can be made, and load fluctuation in contact can be further amplified; whereby contact can accurately be detected according to load fluctuation in the first direction or in the second direction. Also there is provided the advantage that damages caused by metal fatigue due to repeated contact by a tool or the like can be reduced.

With the contact detecting method according to another aspect of the invention, in a state where the movable body is moved at a specified speed in the first direction and in the second direction to make the movable body approach the object for contact by superimposing reciprocal movement in the first direction or in the second direction to movement of the movable body, fluctuation of load to the movable body in the first direction or in the second direction is detected, and contact between the movable body and the object for contact is detected according to the load fluctuation, so that a contact angle of the movable body against the object for contact can be changed according to a ratio of a speed in the first direction vs a speed in the second direction, and by setting the contact angle to an optimal value, large load fluctuation can be obtained, contact detection with high precision can be made, further load fluctuation in contact can further be amplified; whereby contact can accurately be detected according to load fluctuation in the first direction or in the second direction. Further there is provided the advantage that damages caused by metal fatigue due to repeated contact by a tool or the like can be reduced.

With the contact detecting method according to another aspect of the invention, in a state where a movable body is moved at a specified speed in the first direction for approaching the object for contact to make the movable body approach an object for contact and also the object for contact is moved in the second direction slanting at a certain angle against the first direction, load fluctuation of the object for contact in the second direction is detected and contact between the movable body and the object for contact is detected according to this load fluctuation, so that contact can accurately be detected even in a case where sufficient load fluctuation can not be obtained in the side of the movable body.

With the contact detecting method according to another aspect of the present invention, a movable body is moved at a specified speed in the first direction with reciprocal movement in the first direction superimposed to the movement to make the movable body approach an object for contact and the object for contact is moved in the third direction, load fluctuation of the object for contact in the third direction is detected, and contact between the movable body and the object for contact is detected according to this load fluctuation, so that load fluctuation in the third direction in contact can be amplified, and as a result contact can accurately be detected according to load fluctuation in the third direction. Also there is provided the advantage that damages caused by metal fatigue due to repeated contact by a tool or the like can be reduced.

With the contact detecting method according to another aspect of the present invention, in a state where a movable body is moved at a specified speed in the first direction to make the movable body approach an object for contact and is also reciprocally moved in the second direction to make the movable body approach the object for contact and at the same time the object for contact is moved in the third direction slanting at a certain angle against the first direction, load fluctuation of the object for contact in the third direction is detected and contact between the movable body and the object for contact is detected according to this load fluctuation, so that contact can accurately be detected according to load fluctuation in the third direction. Also there is provided the advantage that damages caused by metal fatigue due to repeated contact by a tool or the like can be reduced.

With the contact detecting method according to another aspect of the present invention, in a state where a movable body is moved at a specified speed in the first direction for approaching the object for contact to make the movable body approach an object for contact and at the same time the object for contact is moved in the second direction with reciprocal movement in the second direction superimposed to the movement, load fluctuation of the object for contact in the second direction is detected and contact between the movable body and the object for contact is detected, so that load fluctuation in the second direction in contact can be amplified and as a result contact can accurately be detected according to load fluctuation in the second direction. Also there is provided the advantage that damages caused by metal fatigue due to repeated contact by a tool or the like can be reduced.

With the contact detecting method according to another aspect of the present invention, contact between a movable body and an object for contact is detected according to a combination of load fluctuation in the first direction and that in the second direction, a combination of load fluctuation in the first direction and that in the third direction, a combination of load fluctuation in the second direction and that in the third direction, or a combination of the first, second, and third directions, so that load fluctuation becomes larger as compared to that in a case where load fluctuation is generated only in one direction, and contact detection can accurately be executed even in a case where a direction in which load fluctuation occurs largely is not known.

With the contact detecting method according to another aspect of the present invention, a representative value for driving load such as a speed integration instruction value, a current instruction value, or a current feedback value and positional data for a movable body in the first direction are stored in time series for a certain period of time, and it is determined, when a change rate of the representative value for driving load exceeds a specified value for the specified period of time, that contact between the movable body and an object for contact has occurred, a point of time when the change is started is detected from a point of time when it is determined that the contact above has occurred, and a position indicated by positional data for the movable body in the first direction at this point of time when the change is started is regarded as a contact position, so that a contact position can be identified with high precision.

With the contact detecting method according to another aspect of the present invention, a representative value for driving load such as a speed integration instruction value, a current instruction value, or a current feedback value and positional data for a movable body in the first direction are stored in time series for a certain period of time, and it is determined, when a frequency component for reciprocal movement appears in the representative value for the specified period of time, that contact above has occurred, a point of time when the change is started is detected from a point of time when it is determined that the contact above has occurred, and a position indicated by positional data for the movable body in the first direction at this point of time when the change is started is regarded as a contact position, so that a contact position can be identified with high precision without being affected by external disturbance.

With the contact detecting method according to the present invention, a zone where it is expected that load fluctuation in the first direction cyclically increases in response to a frequency of the reciprocal movement is specified according to reciprocal movement in the first direction or in the second direction, and contact between the movable body and the object for contact is determined by checking whether a change rate of load has exceeded a specified value in this zone or not, so that a contact position can be identified with high precision without being affected by external disturbance.

With the contact detecting method according to another aspect of the present invention, a representative value for driving load in a non-contact state is previously measured together with positional data of a movable body and is stored as a reference change rate, a speed integration instruction value, a current instruction value, or a current feedback value in PI controls for a servo unit for driving in a direction as an object for detection of load fluctuation is detected as a representative value for driving load, a position of the movable body in the first direction at a point of time when a difference between the representative value for driving load and the reference change rate or a change rate of the different exceeds a specified value is determined as a contact position, a point of time when the representative value for driving load starts changing is detected from the point of time when it is determined that the contact occurs, and a position indicated by positional data for the movable body in the first direction at the point of time when the representative value for driving load starts changing is regarded as a contact position, so that a contact position can be identified with high precision.

With the contact detecting method according to another aspect of the present invention, reciprocal movement or a frequency and an amplitude of the reciprocal movement are changeably set according to materials of a movable body or an object for contact, so that reciprocal movement or a frequency and an amplitude of the reciprocal movement can be optimized according to materials of the movable body or the object for contact, and for this reason accurate and stable contact detection can be made in machine tool using a plurality of tools or works.

With the contact detecting apparatus according to another aspect of the present invention, in a state where a movable body is moved by a control unit at a specified speed in the first direction (for instance, in the X-axial direction) to make the movable body approach an object for contact and at the same time is reciprocally moved in the second direction (for instance, in the Y-axial direction), load fluctuation of this movable body in the first direction is detected and contact between the movable body and an object for contact is determined by a contact determining unit according to the load fluctuation, so that load fluctuation in the first direction in contact can be amplified, and as a result contact can accurately be detected according to load fluctuation in the first direction. Also there is provided the advantage that damages caused by metal fatigue due to repeated contact by a tool or the like can be reduced.

With the contact detecting apparatus according to another aspect of the present invention, in a state where a movable body is moved by a control unit at a specified speed in the first direction with movement thereof in the second direction stopped to make the movable body approach an object for contact, load fluctuation in the stopped state in the second direction is detected, and contact between the movable body and the object for contact is determined by a contact determining unit according to this load fluctuation, so that contact can accurately be detected according to even minute load fluctuation without being affected by external disturbance.

With the contact detecting apparatus according to another aspect of the present invention, in a state where a movable body is moved by a control unit at a specified speed in the first direction with movement thereof in the second direction stopped to make the movable body approach an object for contact with reciprocal movement superimposed to the movement, load fluctuation in the stopped state in the second direction is detected, and contact between the movable body and the object for contact is determined by a contact determining unit according to this load fluctuation, so that contact can accurately be detected according to even minute load fluctuation without being affected by mechanical external disturbance, and also load fluctuation in contact in the second direction can be amplified, and as a result contact can accurately be detected according to load fluctuation in the second direction. Also there is provided the advantage that damages caused by metal fatigue due to repeated contact by a tool or the like can be reduced.

With the contact detecting apparatus according to another aspect of the present invention, in a state where a movable body is moved by a control unit at a specified speed in the first direction as well as in the second direction to make the movable body approach an object for contact, load fluctuation of this movable body in the first direction or in the second direction is detected, and contact between the movable body and the object for contact is determined by a contact determining unit according to this load fluctuation, so that a contact angle of the movable body against the object for contact can be changed according to a ratio of a speed in the first direction vs a speed in the second direction, and by setting this contact angle to an appropriate value, large load fluctuation can be obtained and contact detection with high precision can be executed.

With the contact detecting apparatus according to another aspect of the present invention, in a state where a movable body is moved in the first direction as well as in the second direction at a specified speed respectively to make the movable body approach an object for contact with reciprocal movement in the first direction or in the second direction superimposed to the movement thereof, load fluctuation of the movable body in the first direction or in the second direction is detected, and a contact between the movable body and the object for contact is determined by a contact determining unit according to this load fluctuation, so that a contact angle of the movable body against the object for contact can be changed according to a ratio of a speed in the first direction vs a speed in the second direction, and by setting the contact angle to an optimal value, large load fluctuation can be obtained, contact detection can be made with high precision, and further load fluctuation in contact can be amplified, and as a result contact can accurately be detected according to load fluctuation in the first direction or in the second direction. Also there is provided the advantage that damages caused by metal fatigue due to repeated contact by a tool or the like can be reduced.

With the contact detecting apparatus according to another aspect of the present invention, in a state where a movable body is moved at a specified speed in the first direction as well as in the second direction to make the movable body approach an object for contact with reciprocal movement in the first direction and in the second direction superimposed to the movement thereof, load fluctuation of the movable body in the first direction or in the second direction is detected, and contact between the movable body and the object for contact is determined by a contact determining unit according to this load fluctuation, so that a contact angle of the movable body against the object for contact can be changed according to a ratio of a speed in the first direction vs a speed in the second direction, and by setting the contact angle to an optimal value, large load fluctuation can be obtained, contact detection with high precision can be executed, and in addition load fluctuation in contact can further be amplified, and as a result contact can accurately be detected according to load fluctuation in the first direction or in the second direction. Also there is provided the advantage that damages caused by metal fatigue due to repeated contact by a tool or the like can be reduced.

With the contact detecting apparatus according to another aspect of the present invention, in a state where a movable body is moved by a control unit at a specified speed in the first direction for approaching an object for contact to make the movable body approach the object for contact and at the same time the object for contact is moved in the third direction slanting at a certain angle against the first direction, load fluctuation of the object for contact in the third direction is detected, and contact between the movable body and the object for contact is determined by a contact determining unit according to this load fluctuation, so that contact can accurately be detected even in a case where load fluctuation can not sufficiently be obtained in the side of the movable body.

With the contact detecting apparatus according to another aspect of the present invention, in a state where a movable body is moved by a control unit at a specified speed in the first direction for approaching an object for contact to make the movable body approach the object for contact with reciprocal movement in the first direction superimposed to the movement thereof and at the same time the object for contact is moved in the third direction slanting at a certain angle against the first direction, load fluctuation of the object for contact in the third direction is detected, and contact between the movable and the object for contact is determined by a contact determining unit according to this load fluctuation, so that load fluctuation in contact in the third direction can be amplified, and as a result contact can accurately be detected according to load fluctuation in the third direction. Also there is provided the advantage that damages caused by metal fatigue due to repeated contact by a tool or the like can be reduced.

With the contact detecting apparatus according to another aspect of the present invention, in a state where a movable body is moved by a control unit at a specified speed in the first direction to the movement to make the movable body approach an object for contact and is also reciprocally moved in the second direction to make the movable body approach the object for contact and at the same time object for contact is moved in third direction slanting at a certain angle against the first direction, load fluctuation of the object for contact is detected, and contact between the movable body and the object for contact is determined by a contact determining unit according to the load fluctuation, so that load fluctuation in contact in the third direction can be amplified, and as a result contact can accurately be detected according to load fluctuation in the third direction. Also there is provided the advantage that damages caused by metal fatigue due to repeated contact by a tool or the like can be reduced.

With the contact detecting apparatus according to another aspect of the present invention, in a state where a movable body is moved by a control unit at a specified speed in the first direction for approaching an object for contact to make the movable body approach the object for contact and at the same time the object for contact is moved in the third direction with reciprocal movement in the third direction superimposed to the movement, load fluctuation of the object for contact in the third direction is detected, and contact between the movable body and the object for contact is determined by a contact determining unit according to this load fluctuation, so that load fluctuation in contact in the third direction can be amplified, and as a result contact can accurately be detected according to load fluctuation in the third direction. Also there is provided the advantage that damages caused by metal fatigue due to repeated contact by a tool or the like can be reduced.

With the contact detecting apparatus according to another aspect of the present invention, the contact determining unit determines contact between a movable body and an object for contact according to a combination of load fluctuations in the first direction and the second direction, a combination of those in the first direction and the third direction, a combination of those in the second direction and the third direction, or a combination of those in the first, second and third directions, so that load fluctuation becomes larger as compared to that in a case where load fluctuation is generated only on one direction, and also contact can accurately be made even in a case where a direction in which large load fluctuation is generated is not known.

With the contact detecting apparatus according to another aspect of the present invention, the storing unit stores therein a representative value for driving load such as a speed integration instruction value, a current instruction value, or a current feedback value together with positional data for a movable body in the first direction in time series for a specified period of time, the contact determining unit determines, when a change rate of the representative value for driving load exceeds a specified value during the specified period of time, that contact between the movable body and the object for contact has occurred, the contact position identifying unit detects a point of time when the representative value for driving load starts changing from the point of time when it is determined that the contact has occurred, and regards as a contact position a position indicated by positional data for the movable body in the first direction at the point of time when the representative value for driving load starts changing, so that a contact position can be identified with high precision.

With the contact detecting apparatus according to another aspect of the present invention, the storing unit stores therein a representative value for driving load such as a speed integration instruction value, a current instruction value, or a current feedback value together with positional data for a movable body in the first direction in time series for a specified period of time, the contact determining unit determines, when a frequency component for reciprocal movement appears in the representative value for driving load for the specified period of time, that contact between the movable unit and an object for contact has occurred, the contact position identifying unit detects a point of time when the representative value for driving load starts changing from the point of time when it is determined that contact between the movable body and the object for contact has occurred, and regards as a contact position a position indicated by positional data for the movable body in the first direction at the point of time when it is determined that the representative value for driving load starts changing, so that a contact position can be identified with high precision without being affected by external disturbance.

With the contact detecting apparatus according to another aspect of the present invention, the contact determining unit identifies a zone where it is expected that load fluctuation in the first direction cyclically increases according to a frequency of reciprocal movement in the second direction due to reciprocal movement in the first direction or in the second direction, and determines contact between the movable body and an object for contact by checking whether a change rate of load has exceeded a specified value in this zone or not, so that a contact position can be identified with high precision without being affected by external disturbance.

With the contact detecting apparatus according to another aspect of the present invention, the storing unit stores therein a representative value for driving load in a non-contact state together with positional data for the movable body as a reference change rate, the contact determining unit determines a position of the movable body in the first direction when a difference between the representative value for driving load and the reference change rate stored in the storing unit or a change rate of the difference exceeds a specified value as a contact determined position, detects a point of time when the representative value for driving load starts changing from the point of time when it is determined that contact between the movable body and an object for contact has occurred, and regards as a contact position a position indicated by positional data for the movable body in the first direction at the point of time when the change is started, so that a contact position can be identified with high precision.

With the contact detecting apparatus according to another aspect of the present invention, the control unit changeably sets reciprocal movement or a frequency and an amplitude of the reciprocal movement according to materials of a movable body or an object for contact, so that reciprocal movement or a frequency and an amplitude of the reciprocal movement can be optimized according to materials of the movable body or the object for contact, so that accurate and stable contact detection can be made in a machining tool using a plurality of tools or works.

This application is based on Japanese patent application No. HEI 9-253990 filed in the Japanese Patent Office on Sep. 18, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contact detecting method of detecting contact between a movable body and an object for contact, said movable body movable in a first direction for approaching said object for contact and in a second direction slanting at a certain angle against said first direction, comprising the steps of:

moving said movable body at a specified speed in said first direction to make said movable body approach said object for contact and simultaneously moving said movable body in said second direction to generate fluctuation in load to said movable body in said first direction during movement of said movable body; and detecting a load fluctuation in said first direction.

2. A contact detecting method according to claim 1; further comprising the step of detecting load fluctuation in other directions; and detecting contact between said movable body and said object for contact based on a combination of load fluctuation in a plurality of directions.

3. A contact detecting method according to claim 1, wherein detecting said load fluctuation in said first direction comprises;

detecting a speed integration instruction value, a current instruction value, or a current feedback value in PI control of a servo unit for driving in a direction as an object for detection of load fluctuation as a representative value for driving load;

storing said representative values for driving load and positional data of said movable body during a specified period of time in time series;

determining, when an increase rate of said representative value for driving load exceeds a specified value during said specified period of time, that contact occurred;

detecting a point of time when said representative value for driving load starts changing from this point of time when it is determined that contact has occurred; and regarding as a contact position a position indicated by positional data of said movable body in said first direction at this point of time when said representative value for driving load starts changing.

4. A contact detecting method according to claim 1, wherein detecting said load fluctuation in said first direction comprises;

detecting a speed integration instruction value, a current instruction value, or a current feedback value in PI control of a servo unit for driving in a direction as an object for detection of load fluctuation as a representative value for driving load;

storing said representative values for driving load and positional data of said movable body during a specified period of time in time series;

determining, when a frequency component of reciprocal movement appears in said representative value for driving load during said specified period of time, that contact has occurred;

detecting a point of time when said representative value for driving load starts changing from this point of time when it is determined that contact has occurred; and regarding as a contact position a position indicated by positional data of said movable body in said first direction at this point of time when said representative value for driving load starts changing.

5. A contact detecting method according to claim 1 further comprising the steps of:

specifying a zone where it is expected for load fluctuation in said first direction to cyclically increase according to a frequency of reciprocal movement due to reciprocal movement in said first direction or in said second direction; and determining whether said movable body and said object for contact has contacted to each other by checking whether a change rate of load fluctuation in this zone has exceeded a specified rate or not.

6. A contact detecting method according to claim 1, wherein detecting the load fluctuation in the first direction comprises;

measuring a representative value for driving load in a non-contact state previously together with positional data of said movable body and storing the measured value as a reference change rate;

detecting a speed integration instruction value, a current instruction value, or a current feedback value in PI control of a servo unit for driving in a direction as an object for detection of load fluctuation as a representative value for driving load;

determining as a contact point a position of said movable body in said first direction at a point of time when a difference between this representative value for driving load and said reference change rate or a change rate of said difference exceeds a specified rate;

detecting a point of time when said representative value for driving load starts changing from this point of time when it is determined that contact has occurred; and regarding as a contact position a position indicated by positional data of said movable body in said first direction at said point of time when said representative value for driving load starts changing.

7. A contact detecting method according to claim 1; wherein said movable body is moved reciprocally in said second direction, and wherein a frequency and an amplitude of said reciprocal movement are changeably set according to materials of said movable body or said object for contact.

8. A contact detecting method of detecting contact between a movable body and an object for contact, said movable body movable in a first direction to approach said object for contact, comprising the steps of:

making said movable body approach said object for contact by way of moving said movable body in said first direction to generate fluctuation in load to said movable body in a second direction, which slants at a certain angle against said first direction, during movement of said movable body in said first direction; wherein said movable body and said object for contact are made closer to each other by superimposing reciprocal movement with a specified frequency and a specified amplitude in said first direction onto movement of said movable body; and detecting said load fluctuation to determine contact between said movable body and said object for contact according to said load fluctuation.

9. A contact detecting method of detecting contact between a movable body and an object for contact, said movable body movable in a first direction for approaching said object for contact and in a second direction slanting at a certain angle against said first direction, comprising the steps of:

moving said movable body in said first direction as well as in said second direction to generate fluctuation in load to said movable body in the first direction or in the second direction during movement of said movable body; and detecting said load fluctuation to determine contact between said movable body and said object for contact according to said load fluctuation.

10. A contact detecting method according to claim 9; wherein said movable body and said object for contact are made closer to each other by superimposing reciprocal movement with a specified frequency and a specified amplitude in one of said first direction or in said second direction onto movement of said movable body.

11. A contact detecting method according to claim 9; wherein said movable body and said object for contact are made closer to each other by superimposing reciprocal movement with a specified frequency and a specified amplitude in said first direction and also reciprocal movement with a specified frequency and a specified amplitude in said second direction onto movement of said movable body.

12. A contact detecting method of detecting a contact between a movable body and an object for contact, said movable body movable in a first direction for approaching said object for contact and said object for contact movable in a second direction slanting at a certain angle against said first direction, comprising the steps of:

moving said movable body in said first direction at a specified speed to make said movable body approach said object for contact and also moving said object for contact in said second direction; and detecting fluctuation in load to said object for contact in said second direction during movement of said movable body and said object for contact to determine contact between said movable body and said object for contact according to said load fluctuation.

13. A contact detecting method according to claim 12; wherein said movable body and said object for contact are made closer to each other by superimposing reciprocal movement with a specified frequency and a specified amplitude in said first direction to movement of said movable body.

14. A contact detecting method according to claim 12, wherein said movable body is movable not only in said first direction but also in a third direction slanting at a certain angle against said first direction, and wherein said movable body approaches said object for contact in said first direction at a specified speed and also reciprocally moves at a specified frequency and a specified amplitude in said third direction.

15. A contact detecting method according to claim 12; wherein reciprocal movement with a specified frequency and a specified amplitude in said second direction is superimposed to movement of said object for contact.

16. A contact detecting apparatus for detecting a contact between a movable body and an object for contact, said movable body movable in a first direction for approaching said object for contact as well as in a second direction, which slants at a certain angle against said first direction, said apparatus comprising:
- a control unit for moving said movable body at a specified speed in the first direction for approaching said object for contact and also for simultaneously moving said movable body in said second direction to generate fluctuation of load to said movable body during movement of the movable body in said first direction; and
- a contact determining unit for detecting said load fluctuation and determining according to said load fluctuation that said movable body and said object for contact have contacted each other.

17. A contact detecting apparatus according to claim 16; wherein said contact determining unit is operating to detect load fluctuation in a plurality of directions and determine that said movable body and said object for contact have contacted each other according to a combination of load fluctuations in said plurality of directions.

18. A contact detecting apparatus according to claim 16 further comprising:
- a storing unit for storing, assuming an instruction value for speed integration, an instruction value for a current, or a current feedback value in PI controls of a servo unit for driving in a direction as an object for detection of load fluctuation as a representative value for driving load, said representative value for driving load during a specified period of time and positional data for said movable body in said first direction in time series; and
- a contact position identifying unit for detecting a point of time when said representative value for driving load starts changing from a point of time when it is determined by said contact determining unit that the contact between said movable body and said object for contact has occurred when a change rate of said representative value for driving load exceeds a specified value during said specified period of time and regarding as a contact position a position indicated by said positional data of said movable body in said first direction at this point of time when the change starts.

19. A contact detecting apparatus according to claim 16 further comprising:
- a storing unit for storing, assuming an instruction value for speed integration, an instruction value for a current, or a current feedback value in PI controls of a servo unit for driving in a direction as an object for detection of load fluctuation as a representative value for driving load, said representative value for driving load during a specified period of time and positional data for said movable body in said first direction in time series; and
- a contact position identifying unit for detecting a point of time when said representative value for driving load starts changing from the point of time when it is determined by said contact determined unit that contact has occurred when a frequency component of reciprocal movement appears in said representative value for driving load during said specified period of time, and regarding as a contact position a position indicated by positional data of said movable body in said first direction at this point of time when said representative value for driving load starts changing.

20. A contact detecting apparatus according to claim 16; wherein said contact determining unit specifies a zone in which it is expected for the load fluctuation in said first direction to cyclically increase in response to a frequency of reciprocal movement of said movable body in said first direction or in said second direction, an d determines whether contact between said movable body and s aid object for contact has occurred by checking whether a change rate in load has exceeded a specified rate or not in this zone.

21. A contact detecting method according to claim 16 further comprising:
- a storing unit for storing, assuming an instruction value for speed integration, an instruction value for a current, or a current feedback value in PI controls of a servo unit for driving in a direction as an object for detection of load fluctuation as a representative value for driving load, the representative value for driving load in a non-contact state together with positional data of said movable body as a reference change rate; wherein said contact determining unit determines as a contact-determined position a position of said movable body in said first direction at a point of time when a difference between the representative value for driving load and said reference change rate stored in said storing unit or a change rate in the difference has exceeded a specified value; and
- a contact position identifying unit which detects a point of time when said representative value for driving load starts changing from a point of time when it is determined that contact has occurred, and regarding as a contact position a position indicated by positional data of said movable body in said first direction at a point of time when the representative value for driving load starts changing.

22. A contact apparatus according to claim 16; wherein said control unit changeably sets a frequency or an amplitude of a reciprocal movement of said movable body according to materials of said movable body and said object for contact.

23. A contact detecting apparatus for detecting contact between a movable body and an object for contact, said movable body movable in a first direction for approaching said object for contact, said apparatus comprising:
- a control unit for providing controls for making said movable body approach said object for contact by way of moving said movable body in said first direction to generate load fluctuation to said movable body in a second direction, which slants at a certain angle against said first direction during movement of said movable body in said first direction; wherein said control unit makes said movable body approach said object for contact by superimposing reciprocal movement of said movable body in said first direction with a specified frequency and a specified amplitude; and a contact determining unit detecting said load fluctuation and determining according to said load fluctuation that contact between said movable body and said object for contact has occurred.

24. A contact detecting apparatus for detecting contact between a movable body and an object for contact, said movable body movable in a first direction for approaching said object for contact as well as in a second direction, which slants at a certain angle against said first direction, said apparatus comprising:

a control unit operating to control said movable body to approach said object for contact in said first direction and in said second direction at a specified speed respectively; and a contact determining unit for detecting fluctuation of load to said movable body in said first direction or in said second direction during movement of said movable body and determining according to said load fluctuation that said movable body and said object for contact have contacted each other.

25. A contact detecting apparatus according to claim 24; wherein said control unit provides controls for making said movable body approach said object for contact by superimposing reciprocal movement with a specified frequency and a specified amplitude in said first direction or in said second direction to movement of said movable body.

26. A contact detecting apparatus according to claim 24; wherein said control unit provides controls for making said movable body approach said object for contact by superimposing reciprocal movement with a specified frequency and a specified amplitude in said first direction as well as reciprocal movement with a specified frequency and a specified amplitude in said second direction to movement of said movable body.

27. A contact detecting apparatus for detecting contact between a movable body and an object for contact comprising:

a control unit for providing controls for making said movable body approach said object for contact by way of moving said movable body at a specified speed in a first direction for approaching said object for contact and also moving said object for contact in a second direction slanting at a certain angle against said first direction; and a contact determining unit for detecting fluctuation of load to said object for contact in said second direction during movement of said movable body as well as of said object for contact and determining according to said load fluctuation that said movable body and said object for contact have contacted each other.

28. A contact detecting apparatus according to claim 27; wherein said control unit provides controls for making said movable body approach said object for contact by superimposing reciprocal movement with a specified frequency and a specified amplitude in said first direction to movement of said movable body.

29. A contact detecting apparatus according to claim 27; wherein said control unit provides controls for reciprocally moving said movable body at a specified frequency and a specified amplitude in said second direction while moving said movable body in said first direction at a specified speed for making said movable body approach said object for contact.

30. A contact detecting apparatus according to claim 27; wherein said control unit superimposes reciprocal movement with a specified frequency and a specified amplitude in a third direction to movement of said movable body.

\* \* \* \* \*